US 9,329,032 B2

(12) United States Patent  
Oda

(10) Patent No.: US 9,329,032 B2  
(45) Date of Patent: May 3, 2016

(54) TREAD THICKNESS MEASURING METHOD

(71) Applicant: BRIDGESTONE CORPORATION, Tokyo (JP)

(72) Inventor: Keiji Oda, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 211 days.

(21) Appl. No.: 14/357,962

(22) PCT Filed: Nov. 14, 2012

(86) PCT No.: PCT/JP2012/079531  
§ 371 (c)(1),  
(2) Date: May 13, 2014

(87) PCT Pub. No.: WO2013/073584  
PCT Pub. Date: May 23, 2013

(65) Prior Publication Data  
US 2014/0311246 A1    Oct. 23, 2014

(30) Foreign Application Priority Data  
Nov. 14, 2011   (JP) ................................. 2011-249077

(51) Int. Cl.  
*G01B 17/02*      (2006.01)

(52) U.S. Cl.  
CPC ......... *G01B 17/02* (2013.01); *B60C 2011/0033* (2013.04)

(58) Field of Classification Search  
CPC .................... G01B 17/02; B60C 2011/0033  
USPC .......................................................... 73/627  
See application file for complete search history.

(56) References Cited

U.S. PATENT DOCUMENTS 4,089,225 A * 5/1978 Kraska ................ G01M 17/025  
73/614  
5,455,805 A   10/1995 Etienne  
2002/0088527 A1   7/2002 Tanaka et al.

FOREIGN PATENT DOCUMENTS

EP    1 189 014 A2   3/2002  
EP    2 025 501 A1   2/2009  
(Continued)

OTHER PUBLICATIONS

May 11, 2015 Extended European Search Report issued in European Patent Application No. 12849502.5.

(Continued)

*Primary Examiner* — John Chapman, Jr.  
(74) *Attorney, Agent, or Firm* — Oliff PLC

(57) ABSTRACT

A method for measuring the tread thickness from the radially outermost belt surface within a tire to the tread surface accurately by ultrasonic measurement whatever the type of belt material is. The method includes the steps of measuring a profile of the tread surface, identifying the bottom positions of circumferentially extending grooves from the profile measured, estimating the depths from the groove bottoms to the belt surface from the identified groove bottoms and pre-created tire design data, predicting thicknesses by calculating predicted thicknesses from the tread surface to the belt surface from the relationship between the thicknesses from the identified groove bottoms to the tread surface in the profile and the estimated depths from the groove bottoms to the belt surface, and setting amplification factors for received reflected waves according to a reflection factor-thickness data map prepared beforehand in correspondence to the predicated thicknesses.

2 Claims, 16 Drawing Sheets

(56) References Cited

FOREIGN PATENT DOCUMENTS

| JP | S58-1546 A | 1/1983 |
|---|---|---|
| JP | 63-241351 | 10/1988 |
| JP | H05-18731 A | 1/1993 |
| JP | 06-225877 | 8/1994 |
| JP | 09-239866 | 9/1997 |
| JP | 2002-086586 | 3/2002 |
| JP | 2007-212278 | 8/2007 |

OTHER PUBLICATIONS

Feb. 5, 2013 International Search Report issued in International Application No. PCT/JP2012/079531.

* cited by examiner

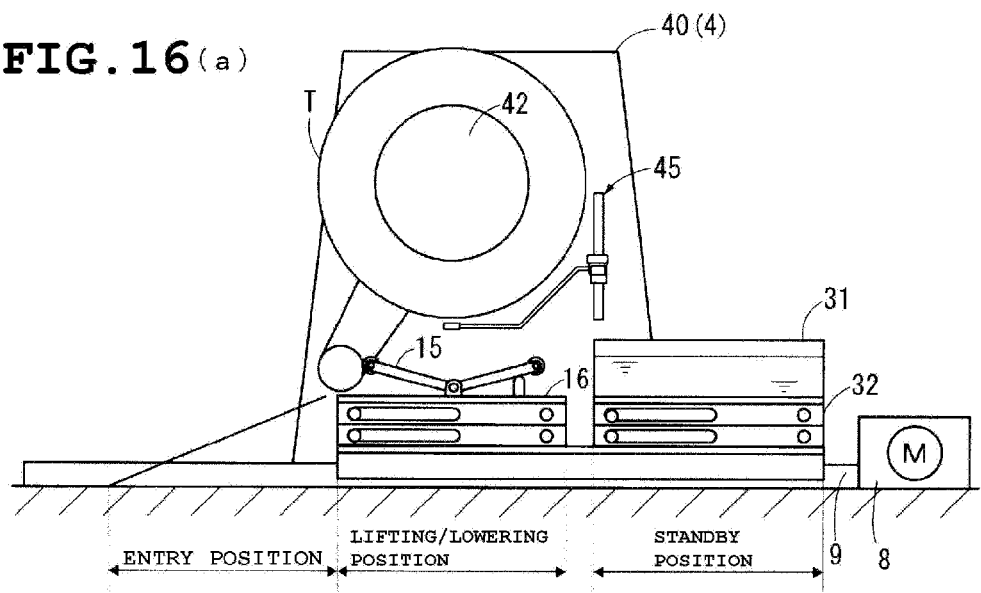
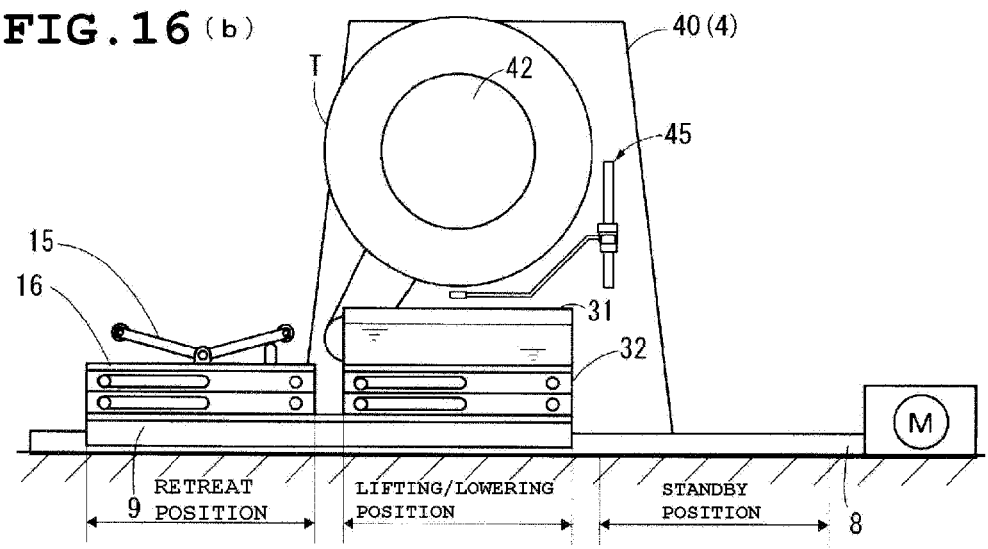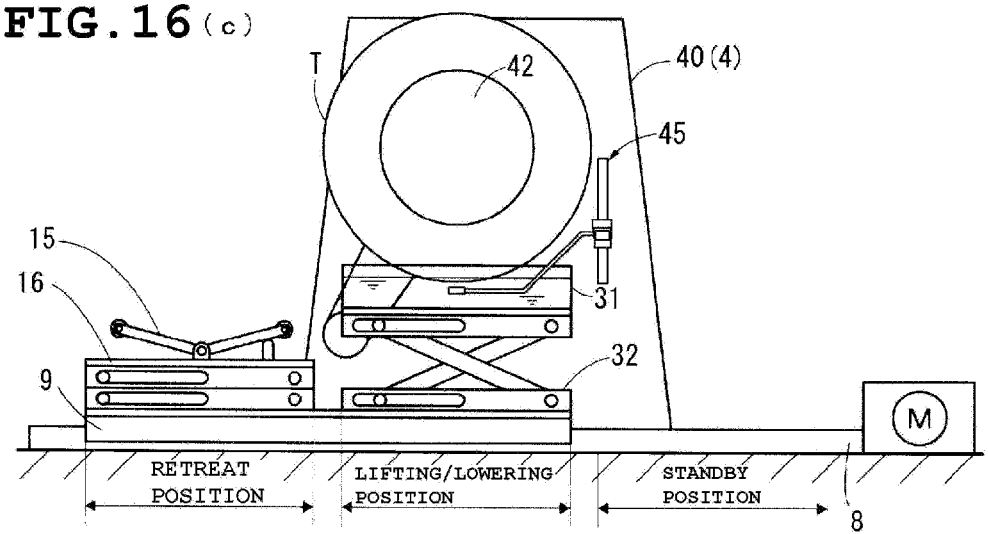

TREAD THICKNESS MEASURING METHOD

BACKGROUND OF THE INVENTION

1. Field of the Invention

The present invention relates to a tread thickness measuring method and, in particular, to a method of measuring the tread thickness from the belt surface located in a radially outer position within a tire to the tread surface.

2. Description of the Related Art

In a conventional method of retreading a used tire, a worn tread of the tire is abraded by buffing into a predetermined shape to form a bonding surface to which a new tread is bonded. Then, through certain steps, the new tread is bonded to the bonding surface. To form the bonding surface, the thickness of tread to be removed must be determined first. So a measurement is taken of the tread thickness from the tread surface to the outermost belt located in the radially outermost position of the belt layer, which is one of the structural members of a tire. The measurement of the tread thickness is done with a non-contact eddy-current sensor, for instance. The eddy-current sensor has a detection coil therein. When a magnetic flux is induced with a high-frequency current passed through the detection coil, an eddy current is created in the belt layer by the induced magnetic flux. This will cause a change in the magnetic flux in the detection coil. And by detecting the change in impedance occurring in the detection coil, the thickness from the tread surface to the outermost belt surface can be measured.

PRIOR ART DOCUMENT

Patent Document

Patent Document 1: Japanese Unexamined Patent Application Publication No. 2002-86586

SUMMARY OF THE INVENTION

Problem to be Solved by the Invention

However, the eddy-current sensor performs the measurement of tread thickness by creating an eddy current in the belts. As such, if the belts used in a tire are not steel belts made of steel cords, then the eddy-current sensor will be useless in measuring the tread thickness. That is, if the belts are fiber belts made of fiber cords of organic fiber or other non-metallic material, then, without the induction of a magnetic flux in the belt, it will be impossible to measure the distance from the tread surface to the outermost belt. Thus, when the belts used in the tire are fiber belts, the worker needs to drill small holes at a plurality of circumferential and axial positions of the tire from the tread surface until the surface of the outermost belt is exposed, measure the depth from the tread surface to the outermost belt surface by applying a depth gauge, and determine the depth for buffing operation. This will increase the man-hours for buffing and decrease the work efficiency of tire retreading.

Also, there are cases of tires employing a fiber belt only for the outermost belt of the belt layer. Retreading in such cases is done by first measuring with an eddy-current sensor the depth to the surface of the belt made of steel cords. Then the fiber belt, together with the tread, is abraded by buffing, and a new fiber belt, replacing the fiber belt removed by buffing, is incorporated into the tread to be applied afresh. However, in the fabrication of a tread to be newly bonded to the bonding surface, the tread incorporating the fiber belt entails an increased cost in manufacturing and even raises the retreading cost as a whole.

Also, there may be a method for detecting the fiber belt made of fiber cords as described above for the measurement of the tread thickness by an ultrasonic measurement known as a non-destructive inspection technique. To detect the belt by the use of ultrasonic waves, it is necessary to emit ultrasonic waves to the belt and receive the reflected waves from the belt with precision. To do so, an ultrasound probe, which is designed for ultrasonic measurement, may be moved in contact with the tread surface in the width and circumferential directions of the tire. Yet the unevenness of the tread surface, such as the tire grooves, does not allow the ultrasound probe to be traced along the surface unevenness. As a way conceivable to solve this problem, ultrasonic waves may be emitted from the ultrasound probe to the tread surface through a medium, such as water, that can propagate ultrasonic waves. The ultrasonic waves emitted from the ultrasound probe propagate to the tread surface and then to the inside of the tread after passing through the medium, before the ultrasonic waves are reflected as they hit the tread surface and the belt located in the outermost position of the belt layer. And these reflected waves are received by the ultrasound probe. The reflected waves received by the ultrasound probe have been attenuated by the physical properties of the tread rubber. Therefore the reflected waves are amplified to enable the detection of both the waveforms reflected from the tread surface and from the belt surface. Thus the waveforms reflected off the tread surface and the waveforms reflected off the belt surface are detected from the amplified reflected waves, so that the tread thickness can be measured from the time difference between the detections of these waveforms.

However, the attenuation due to the property of the tread rubber increases proportionately to the thickness of the tread rubber. Hence, amplifying the received reflected waves in a single uniform way may result in excess amplification or insufficient amplification depending on the thickness of the tread. Consequently, it is not possible to measure the tread thickness with accuracy because of the difficulty in distinguishing the amplified waveforms of reflected waves into the waveforms reflected from the tread surface and those reflected from the belt surface. Especially with a used tire, the tread thickness may not be uniform in the width direction of the tire, with a thinner middle portion and thicker side portions thereof. In such a case, amplification of the reflected waves by a fixed amplification factor may lead to excessive amplification in the middle portion of the tread with thinner thickness and insufficient amplification in the side portions with thicker thickness. In response, the worker may determine the tread thickness by identifying the positions of reflection off the tread surface and the belt surface from the waveforms of the amplified reflected waves on experiential grounds. Now, if the buffing amount in a subsequent process is set according to this tread thickness, troubles may arise, such as damage by buffing to the belt surface on both sides of the tire or more than necessary rubber thickness left unremoved.

As a solution to the aforementioned problems, the present invention aims to provide a tread thickness measuring method capable of accurately measuring ultrasonically the tread thickness from the belt surface in an outermost position within a tire to the tread surface irrespective of the type of belt material.

Means for Solving the Problem

In solving the above-described problems, in a first aspect of the present invention, the tread thicknesses from tread surface to belt surface located in a radially outermost position within a tire are measured by emitting ultrasonic waves to the tread surface immersed in a liquid and receiving reflected waves. The method includes the steps of measuring a profile of the tread surface, identifying the bottom positions of circumferentially extending grooves from the profile obtained in the step of measuring a profile, estimating the depths from the groove bottoms to the belt surface from the groove bottoms identified in the step of identifying the bottom positions and pre-created tire design data, predicting thicknesses by calculating predicted thicknesses from the tread surface to the belt surface from a relationship between the thicknesses from the groove bottoms identified in the step of identifying bottom positions to the tread surface in the profile and the depths from the groove bottoms to the belt surface estimated in the step of estimating depths, and setting amplification factors for received reflected waves according to an amplification factor-thickness data map prepared beforehand in correspondence to the predicated thicknesses.

According to this aspect, the bottom positions of the circumferentially extending grooves of a tire are identified from the profile of the tread surface measured in the step of measuring a profile. The depths from the groove bottoms to the belt surface are estimated from the identified groove bottoms and pre-created tire design data. Predicted thicknesses from the tread surface to the belt surface are calculated from the thicknesses from the identified groove bottoms to the tread surface in the profile and the depths from the estimated groove bottoms to the belt surface. And amplification factors in correspondence to the predicated thicknesses are set for the reflected waves received in an ultrasonic measurement according to an amplification factor-thickness data map prepared in advance. This arrangement makes it possible to avoid excess amplification or insufficient amplification. For example, if the reflected waves are amplified excessively, then the noise, too, will be amplified beyond necessity. This can render the waveform of the ultrasonic waves reflected from the belt surface indistinct. Also, if the reflected waves are amplified insufficiently, then there may be cases where the waveform of the ultrasonic waves reflected from the belt surface does not make its appearance, thus resulting in a failure to detect the reflected waves. To solve this problem, the tread thickness is predicted so as to obtain a certain level of reflected waves amplified according to the tread thickness, and the amplification factors are set according to an amplification factor-thickness data map in correspondence to the predicted tread thickness. Thus it is possible to achieve the right level of amplification of the reflected waves. And this will ensure the appearance of both the reflected waves from the tread surface and from the belt surface in the waveform of the amplified reflected waves. As a result, the reflected waves from the tread surface and the reflected waves from the belt surface can be detected easily and accurately, and the tread thickness can be measured with precision.

Also, in a second aspect of the present invention to solve the above-described problems, the step of performing an ultrasonic measurement for measuring the tread thicknesses while keeping a constant distance of emitting ultrasonic waves to the tread surface is further added.

According to this aspect, ultrasonic waves of the same strength can be propagated to the tread surface by keeping a constant distance of emitting ultrasonic waves to the tread surface. Thus, the tread thickness can be measured with greater precision.

BRIEF DESCRIPTION OF THE DRAWINGS

FIG. 16 is measurement process diagrams for the measurement of the tread thickness.

The invention will now be described in detail based on preferred embodiments which do not intend to limit the scope of the claims of the present invention but exemplify the invention. All of the features and the combinations thereof described in the embodiments are not necessarily essential to the invention, and constructions and arrangements to be employed selectively are included in the invention.

BEST MODE FOR CARRYING OUT THE INVENTION

Figure 1:
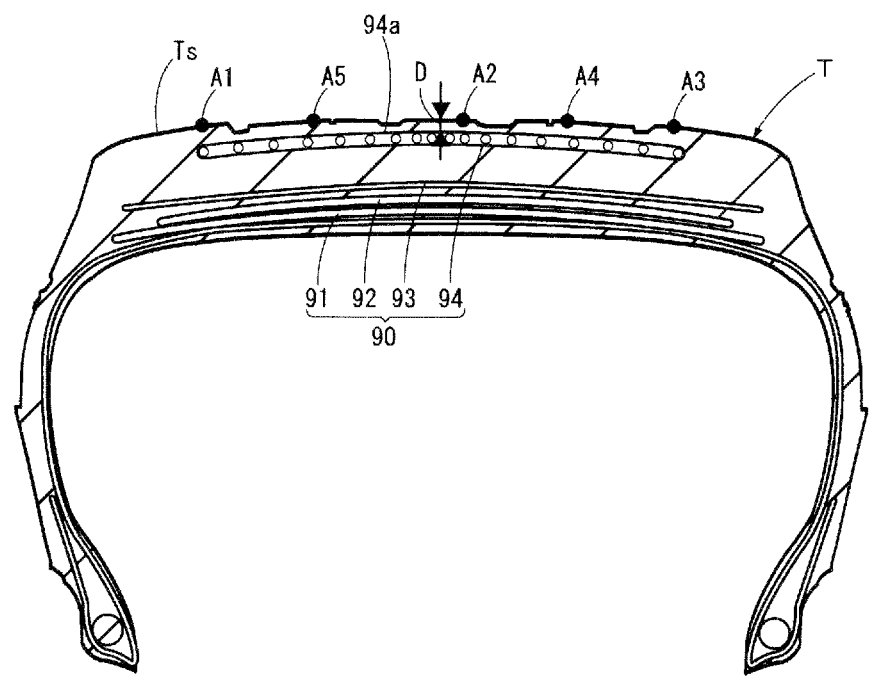
FIG. 1 is a cross-sectional view of a tire.
Figure 2:
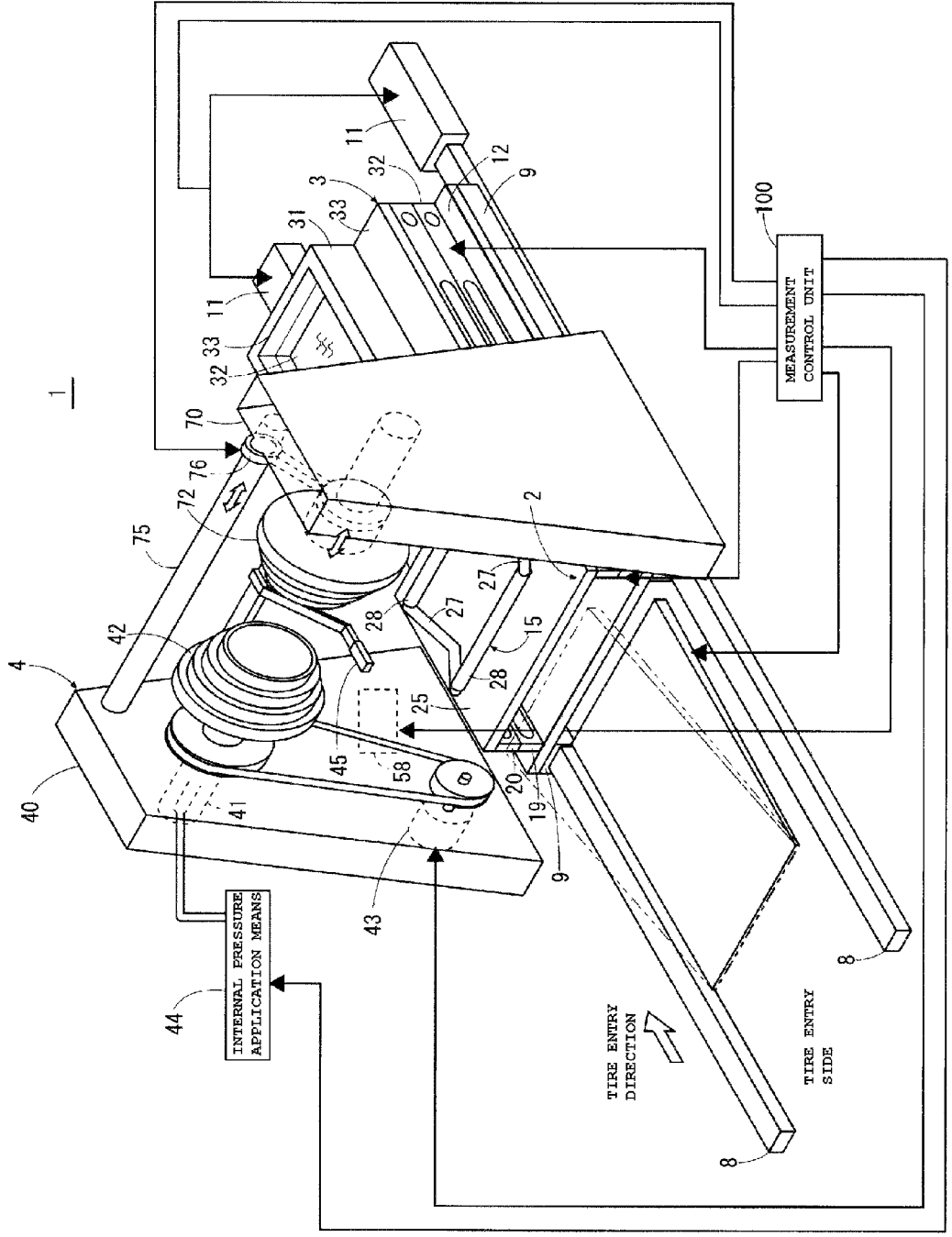
FIG. 2 is a structural illustration of a tread thickness measuring apparatus in accordance with the present invention.

FIG. 1 is a cross-sectional view of a tire T which is subjected to a tread thickness measurement. FIG. 2 is a structural illustration of a tread thickness measuring apparatus 1.

A description is first given of the structure of a tire T of which the tread thickness D is measured with a tread thickness measuring apparatus 1 according to the present invention. The tire T to be subjected to a tread thickness measurement is a used tire, for instance. And, as shown in FIG. 1, the tire T has a belt layer 90, consisting of a plurality of belts 91 to 94, in the tread region. The belt layer 90 is constituted by the belts 91 to 93, which are located in radially inner positions of the tire, and the belt 94, which is located in a radially outermost position of the tire. The belts 91 to 93 are steel belts made of steel cords, whereas the belt 94 is a fiber belt made of non-metallic fiber cords. The tread thickness D according to the present embodiment is the distance from the tread surface Ts to the belt surface 94a of the belt 94 located in the outermost position of the belt layer 90.

Hereinbelow, a description is given of a tread thickness measuring apparatus 1 with reference to FIG. 2.

The tread thickness measuring apparatus 1 is constructed of a tire lifting and lowering unit 2, which lifts and lowers the tire T for tread thickness measurement, a water tank lifting and lowering unit 3, which lifts and lowers a water tank 31 used in the measurement of the tread thickness D of the tire T, and a tire holding unit 4, which holds the tire T for tread thickness measurement.

The tire lifting and lowering unit 2 and the water tank lifting and lowering unit 3 are placed on a pair of rails 8, 8 laid on the floor a predetermined distance apart from each other. Each rail 8 is provided with a slider 9 which moves along its extension direction, and the rail 8, together with the slider 9, constitutes a linear guide. The rails 8, 8 incorporate each a not-shown ball screw mechanism which has a ball screw along the extension direction of the rail 8 and a ball nut threadably mounted on the ball screw. The ball nut, which is secured to the slider 9, moves the slider 9 along the rail 8 as the ball screw rotates. Attached to one end of each ball screw is a servomotor 11, which is a drive means for the slider 9. The servomotors 11, 11, which are each connected to a measurement control unit 100 to be discussed later, perform the drive synchronously according to the signal from the a measurement control unit 100. It is to be noted that the drive means to drive the slider 9 is not limited to the ball screw mechanism and servo motor 11, but the drive may be provided by such drive means as air cylinders. That is, air cylinders are installed along the extension direction of the rails 8, 8, and one end of the air cylinders is secured to the sliders 9 and the other end to the rails 8, 8. Then, with the extension and retraction of the air cylinders, the sliders 9, 9 can be moved along the rails 8, 8.

A flat and rectangular base plate 12 is installed on the sliders 9, 9, and the tire lifting and lowering unit 2 and the water tank lifting and lowering unit 3 are installed on the base plate 12. More specifically, the tire lifting and lowering unit 2 is located on the side where the tire T is carried in, and the water tank lifting and lowering unit 3 on the side downstream of tire entry.

Figure 3:
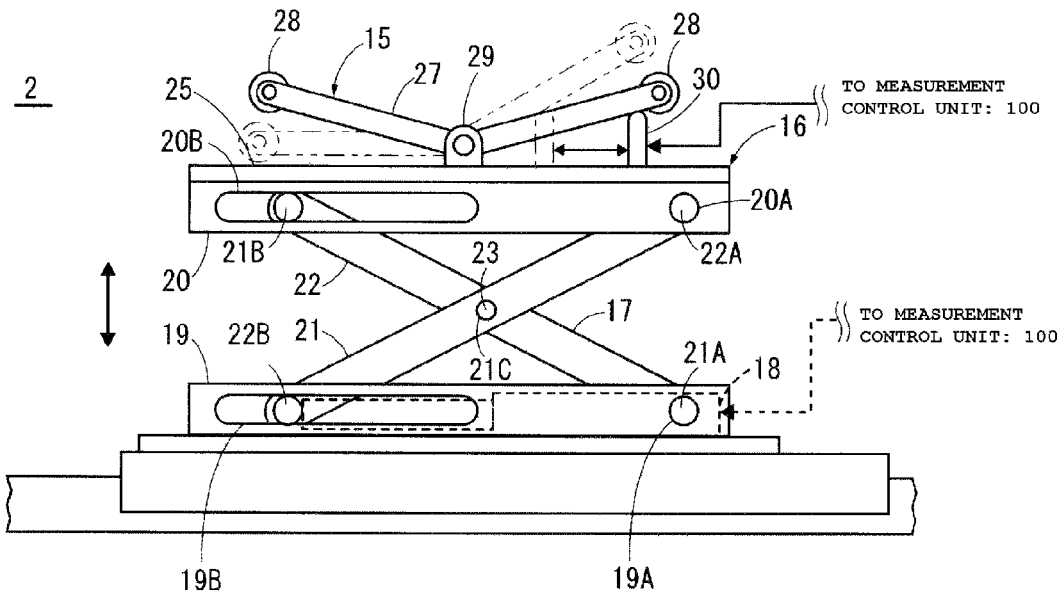
FIG. 3 is a structural diagram of a tire lifting and lowering unit.

FIG. 3 is a structural diagram of a tire lifting and lowering unit 2.

The tire lifting and lowering unit 2 includes a tire mounting unit 15 for mounting the tire T for tread thickness measurement and a tire lifting and lowering mechanism 16 for lifting and lowering the tire mounted on the tire mounting unit 15.

The tire lifting and lowering mechanism 16 includes a pair of X-shaped links 17 and a hydraulic cylinder 18 which controls the cross angle of the X-shaped links 17. The X-shaped links 17 are each constructed of a lower guide member 19 and an upper guide member 20, which guide the link operation, and a pair of link members 21 and 22. The lower guide member 19 and the upper guide member 20 are each constituted by a member having an "I" cross section. The lower guide member 19 and the upper guide member 20 have circular holes 19A and 20A, respectively, on one end side thereof and elongate holes 19B and 20B, respectively, extending from the other end side toward the one end side thereof. The link members 21 and 22, which are each an elongate plate member, have center holes 21C at the center of the length thereof, shafts 21A and 22A, respectively, on one end side thereof, and wheels 21B and 22B, respectively, of the size rotatable along the elongate holes 19B and 20B on the other end side thereof. A pair of the link members 21 and 22 are held turnably on each other with the wheels 21B and 22B facing the same direction and a shaft member, such as a bolt, penetrating through the center holes 21C aligned with each other.

And, of the pair of the link members 21 and 22, one link member 21 is turnably secured to the lower guide member 19 by fitting the shaft 21A of the one link member 21 into the circular hole 19A of the lower guide member 19, and the other link member 22 is held movably along the elongate hole 19B by placing the wheel 22B of the other link member 22 into the elongate hole 19B of the lower guide member 19.

Also, the other link member 22 is turnably secured to the upper guide member 20 by fitting the shaft 22A of the other link member 22 into the circular hole 20A of the upper guide member 19, and the one link member 21 is held movably along the elongate hole 20B by placing the wheel 21B of the one link member 21 into the elongate hole 20B of the upper guide member 20.

The X-shaped links 17 of the structure as described above are placed on the base plate 12 a predetermined distance apart from each other on the right and left as seen in the tire entry direction. The lower guide member 19 is anchored to the base plate 12 by not-shown securing means such as bolts. Also, the right and left X-shaped links 17, 17 are of such design that the lower end portions of the link members 21 and 22 are linked with each other by not-shown coupling rods and the link members 21 and 22 move in synchronism with each other by the agency of the coupling rods. Secured to the coupling rods is one end of the hydraulic cylinder 18, which is the drive source of the lifting and lowering mechanism. The hydraulic cylinder 18 is located between the X-shaped links 17, 17 on the right and left of the top surface 12a of the base plate, and the other end thereof is secured to the base plate 12. The hydraulic cylinder 18, which is connected to a measurement control unit 100 to be discussed later, is extended and retracted by a not-shown hydraulic pump or hydraulic control valve operating according to the signal from the measurement control unit 100. It is to be noted here that the tire lifting and lowering mechanism 16 is not limited to the structure as described above, but may be any mechanism capable of lifting and lowering the tire mounting unit 15 to and from a predetermined height. Also, the drive source for driving the tire lifting and lowering mechanism 16 is not limited to the hydraulic cylinder 18, but the arrangement may be such that the tire lifting and lowering mechanism 16 is driven by an electric motor or the like by way of a power-transmitting mechanism, such as a ball screw mechanism, a gear mechanism, or a belt mechanism.

A mounting plate 25 for mounting a tire T is placed on the upper guide members 20, 20 of the right and left X-shaped links 17, 17.

The mounting plate 25 is a flat plate having a sufficient strength to support the weight of the tire T for tread thickness measurement, and the tire mounting unit 15 is installed on the top surface thereof. On the top surface of the mounting plate 25, supports 29, 29 for supporting the tire mounting unit 15 are placed at a predetermined distance from each other on the right and left sides as seen in the tire entry direction.

The tire mounting unit 15 is constructed of a pair of support plates 27, 27 and a pair of rollers 28, 28 supported by the pair of support plates 27, 27.

The support plate 27, which is a flat plate formed into a V shape, is installed with its extension direction along the tire entry direction. The support plate 27 is turnably attached to the supports 29, 29 of the mounting plate 25 at the center of its length such that the top portions of the V shape can move toward the mounting plate 25. The roller 28 is sandwiched between a pair of support plates 27, 27 and rotatably supported by a shaft penetrating the support plates 27, 27 at each end thereof.

Disposed on the underside of one side of the support plate 27 is a slider 30 which can move along the length direction of the support plate 27 by the operation of a not-shown moving mechanism. The slider 30, which is in contact with the lower surface of the support plate 27, controls the inclination of the tire mounting unit 15.

More specifically, when the tire T is to be mounted on the tire mounting unit 15, the slider 30 is moved toward the upstream side of the tire entry direction so that the tire mounting unit 15 is inclined with the roller 28 on the upstream side moving down and the roller 28 on the downstream side moving up. Then, with the tire T placed on the tire mounting unit 15, the slider 30 is moved toward the downstream side of the tire entry direction to hold the tire mounting unit 15 horizontal. Also, when the tire T is to be carried out, the slider 30 is moved toward the upstream side of the tire entry direction so that the tire mounting unit 15 is inclined toward the upstream side of the tire entry direction.

With the tire mounting unit 15 inclined this way, it is possible to carry a tire T, which can be quite heavy, easily onto or out of the tire mounting unit 15. Also, with the tire T mounted on the tire mounting unit 15 lifted and lowered by the tire lifting and lowering unit 2, it is possible to lift and lower the tire T, which may be light or heavy, to and from the tire holding position of the tire holding unit 4 to be discussed later without the help of the worker.

Figure 4:
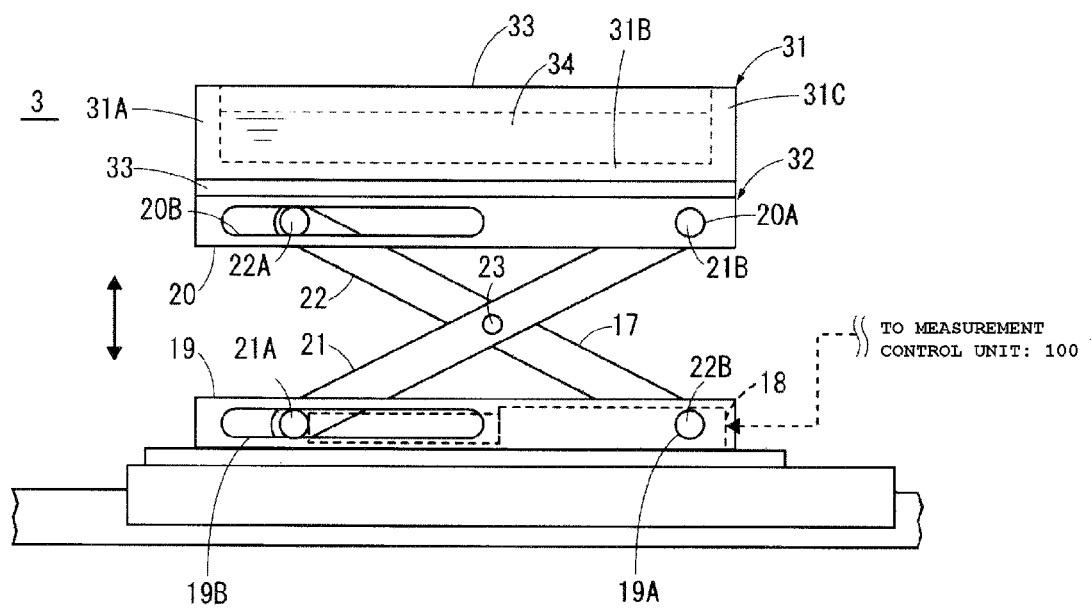
FIG. 4 is a structural diagram of a water tank lifting and lowering unit.

FIG. 4 is a structural diagram of a water tank lifting and lowering unit 3.

The water tank lifting and lowering unit 3 includes a water tank lifting and lowering mechanism 32 for lifting and lowering a water tank 31. Note that the structure of the water tank lifting and lowering mechanism 32 is the same as that of the tire lifting and lowering mechanism 16 and the description thereof will be omitted. The water tank 31 is secured onto the mounting plate 33 of the water tank lifting and lowering mechanism 32.

The water tank 31, which is a rectangular box opening at the top, pools a liquid 34 inside and has an opening 33 large enough to allow the tread surface Ts of the tire T for tread thickness measurement to be immersed in the liquid 34. The liquid 34 to be pooled in the water tank 31 is water, for instance. Note that the liquid 34 is not limited to water, and any liquid medium may be used so long as it can propagate ultrasonic waves. Also, it is to be noted that the water tank 31 may be shaped otherwise with a triangular or (an) arcing shape of the bottom 31B. That is, the amount of the liquid 34 pooled in the water tank 31 may be reduced by forming the water tank 31 in a shape along the curvature of the tire.

Figure 20A:
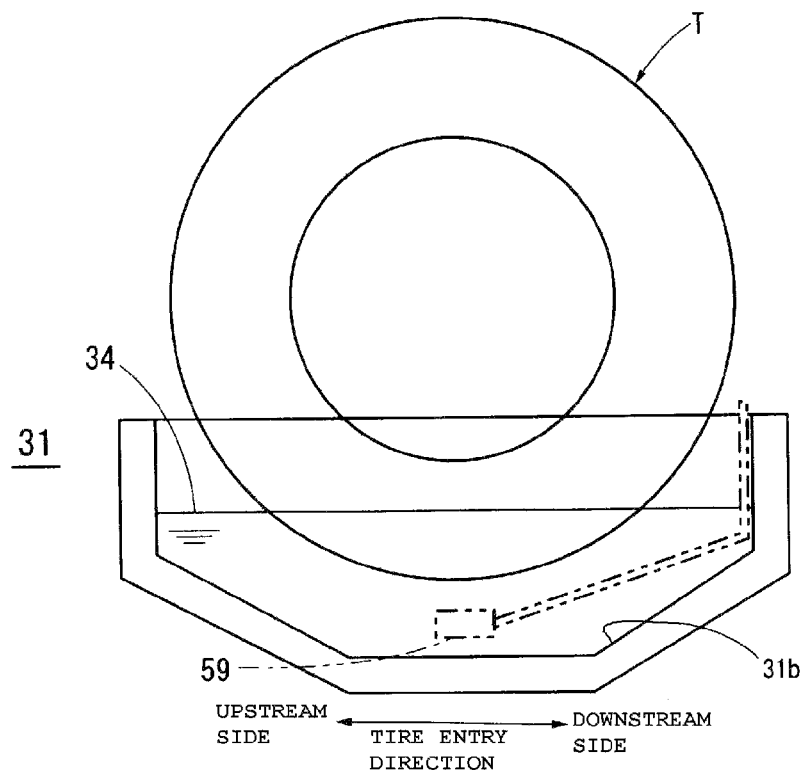
FIG. 20 is schematic diagrams showing other embodiments of the water tank.
Figure 20B:
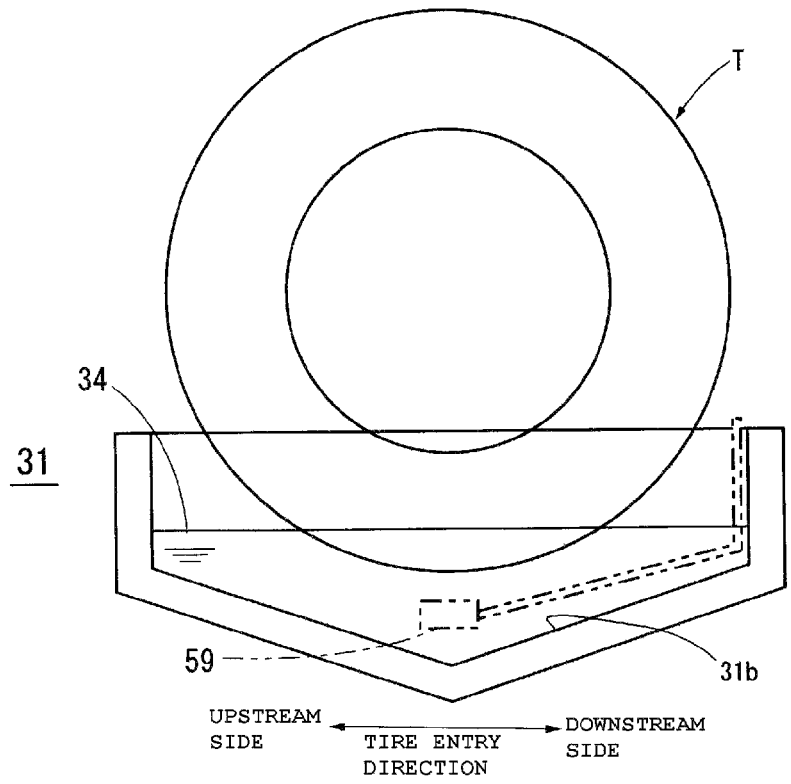

Therefore, the shape of the water tank 31 is not limited to the shapes as mentioned above, but the bottom 31B of the water tank 31 may be formed in an inverted-trapezoidal or triangular shape depressing toward the water tank lifting and lowering unit 3 as shown in FIGS. 20A and 20B. Thus, by employing an inverted-trapezoidal or triangular, the bottom 31B can be formed approximately along the circumference of the tire T, which can not only reduce the amount of the liquid 34 to be pooled in the water tank 31, but also accept tires whether they are of large or small diameter. Also, at the time of measuring the tread thickness D by a thickness measuring apparatus 45 to be discussed later, the depressing region of the bottom 31b provides a clearance for the movement of the ultrasound probe 59, thus preventing the ultrasound probe 59 from hitting the tread surface Ts of the tire T or the bottom 31b of the water tank 31.

Figure 5:
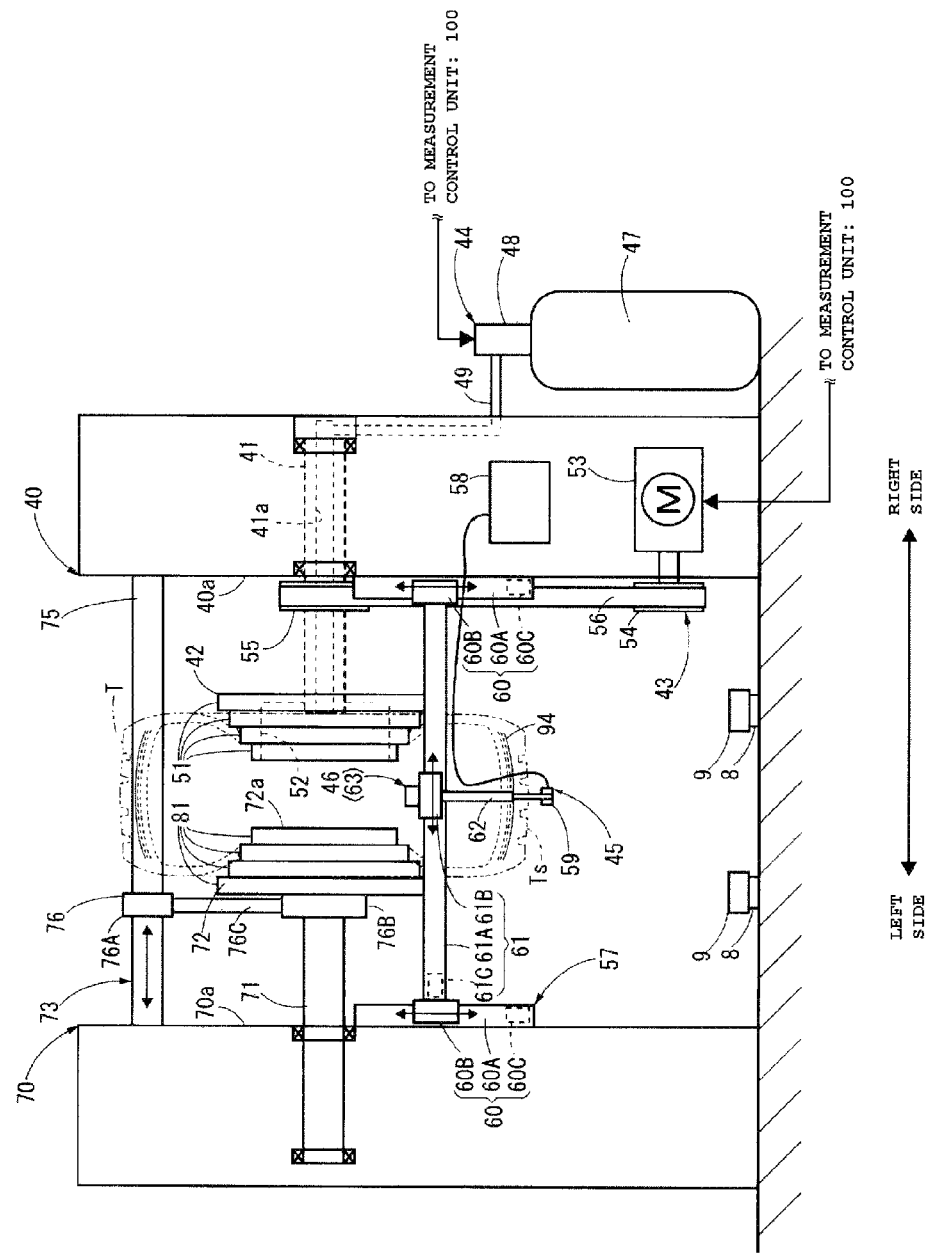
FIG. 5 is a plan view of a tire holding unit.

FIG. 5 is a plan view of a tire holding unit 4.

The tire holding unit 4 is located at the position where the tire lifting and lowering unit 2 lifts and lowers the tire T. More specifically, the tire holding unit 4 is located astride the rail 8, 8 along which the tire lifting and lowering unit 2 and the water tank lifting and lowering unit 3 move.

The tire holding unit 4 includes left and right bodies 40 and 70, which are located with the rails 8, 8 in between, a pair of left and right rim bodies 42 and 72, which are provided on the left and right bodies 40 and 70, respectively, to hold the tire T, an internal pressure application means 44 for applying internal pressure to the tire T held by the left and right rim bodies 42 and 72, a shape measuring means 46 for measuring the external shape, or profile, of the tread surface Ts of the tire T with the internal pressure applied, and a thickness measuring unit 45 for measuring the tread thickness D from the tread surface Ts to the belt 94 of the tire T. Note that the terms "left" and "right" in the following description should be understood to represent the direction as shown in FIG. 2.

Hereinbelow, a description is given of the tire holding unit 4 by referring to the left body 40 and the right body 70 in this order.

The left body 40 includes a left main spindle 41 extending in a direction orthogonal to the extension direction of the rails 8, 8, a left rim body 42 attached to one end of the left main spindle 41 for supporting the tire T, a tire rotating means 43 for rotating the tire T, and an internal pressure application means 44 for applying internal pressure to the tire T held by the left and right rim bodies 42 and 72.

The left main spindle 41, which is a hollow cylinder in shape, extends in a direction orthogonal to the extension direction of the rails 8 above the tire lifting and lowering unit 2. The left main spindle 41 has one end thereof rotatably supported by a bearing or the like within the left body 40 and the other end thereof projecting from one side of the left body 40 toward the right body 70. The one end of the left main spindle 41 is connected to the internal pressure application means 44.

The internal pressure application means 44 includes a compressor 47, a pressure control valve 48 attached to the discharge opening of the compressor 47, a piping 49 connecting the pressure control valve 48 to the one end of the left main spindle 41, and a not-shown air release valve provided at a midway point of the piping 49 to release the air pressure applied in the tire T. The compressor 47 always accumulates pressure higher than the internal pressure to be supplied to the tire T. The pressure control valve 48, which is attached to the discharge opening of the compressor 47, controls the air accumulated in the compressor 47 at a predetermined pressure level. More specifically, the pressure control valve 48, which is connected to the measurement control unit 100, controls the air pressure discharged in response to the signal outputted from the measurement control unit 100 and stops the discharge of the air when the air pressure inside the tire becomes equal to the air pressure discharged. The piping 49, which connects the control valve 48 to the one end of the left main spindle 41, supplies the air discharged from the compressor 47 to the through hole 41a of the left main spindle 41 by way of the control valve 48. The not-shown air release valve, which is provided with an air release outlet, opens the valve in response to the signal outputted from the measurement control unit 100 and releases the air in the tire T through the air release outlet. It is to be noted that the air release outlet of the air release valve remains closed when there is no input of a signal.

The left rim body 42 is formed in a truncated cone shape having a stepped periphery 51 with a plurality of steps. The stepped periphery 51 is formed with steps of diameters corresponding to the different inner diameters of tires. The stepped periphery 51, which performs the function of a bead seat on a wheel, is formed with concentric steps on the left rim body 42. Also, the left rim body 42 has a hollow portion 52 in the middle. The hollow portion 52 is formed as a cylindrical recess from the smaller diameter face toward the larger diameter face of the left rim body 42 and is communicated with the through hole 41a of the left main spindle 41. Therefore, the air sent from the compressor 47 through the control valve 48, the piping 49, and the through hole 41a of the left main spindle 41 is discharged into the hollow portion 52 of the left rim body 42.

The tire rotating means 43 includes a motor 53 secured to the left body 40, a drive pulley 54 attached to the motor 53, spindle-side pulley 55 secured to the left main spindle 41, and a belt 56 set on the spindle-side pulley 55 and the drive pulley 54.

The motor 53 is secured within the left body 40 in such a manner that the rotating shaft of the motor 53 projects from one side of the left body 40. The drive pulley 54, which is of a diameter smaller than that of the spindle-side pulley 55, is attached to the rotating shaft of the motor 53 projecting from the left body 40. The spindle-side pulley 55 is provided between the left rim body 42 attached to the left main shaft 41 and the left body 40. The belt 56, which is set on the drive pulley 54 and the spindle-side pulley 55, rotates the left main spindle 41 by conveying the rotative force of the motor 53 to the spindle-side pulley 55 via the drive pulley 54. The motor 53, which is connected to the measurement control unit 100, performs a drive according to the signal outputted from the measurement control unit 100.

The right body 70, located on the side opposite to the left body 40 with the rails 8, 8 in between, includes a right main spindle 71 corresponding to the left main spindle 41, a right rim body 72 corresponding to the left rim body 42, and a rim body moving means 73 for moving the right rim body 72 closer to or apart from the left rim body 42.

The right main spindle 71, which is provided in the right body 70 coaxially with the left main spindle 41, has one end thereof rotatably supported by a bearing or the like within the right body 70 and the other end thereof projecting from one side of the right body 70 toward the left body 40.

The right rim body 72, which is formed in a truncated cone shape in the same way as with the left rim body 42, is attached coaxially to the right main spindle 71. The right rim body 72 has a stepped periphery 81 with a plurality of steps corresponding to the stepped periphery 51 with a plurality of steps of the left rim body 42. The stepped periphery 81 is formed with the same dimensions and shapes as those of the stepped periphery 51 of the left rim body 42. Unlike the left rim body 42, the right rim body 72 is formed without a hollow portion. Now the left rim body 42 and the right rim body 72 are brought closer to each other to hold the tire T by the bead portions thereof in close contact with any step of the stepped peripheries 51 and 81 of the left rim body 42 and the right rim body 72. And an internal pressure is applied to the tire T as the air supplied to the hollow portion 52 of the left rim body 42 is filled in the space closed by the peripheral surface of the left rim body 42, the internal peripheral surface of the tire, and the peripheral surface and the smaller diameter face 72a of the tight rim body 72.

The rim body moving means 73 includes a bridge member 75 placed between the left body 40 and right body 70 in a position near the top end thereof and a moving member 76 capable of moving along the bridge member 75. The bridge member 75, which may be a cylindrical shaft, bridges between the left body 40 and the right body 70 in a position near the top end thereof. The bridge member 75 has a not-shown built-in drive mechanism capable of moving the moving member 76 along the axis thereof. The drive mechanism may, for instance, be constructed of a ball screw mechanism and a servo motor 74. Thus the ball nut may be moved as the servo motor 74 drives the ball screw of the ball screw mechanism. The servo motor 74, which is connected to the measurement control unit 100, operates in response to the signal outputted from the measurement control unit 100. The moving member 76 is constructed of a smaller ring part 76A, a larger ring part 76B secured to the larger diameter face 72B of the right rim body 72 and moving along the axis of the right main spindle 71, and a connecting member 76C connecting the smaller ring part 76A and the larger ring part 76B. The smaller ring part 76A is secured to the ball nut of the ball screw mechanism, which is the drive mechanism, whereas the larger ring part 76B is secured to the larger diameter face 72B of the right rim body 72. Thus, the tire T can be held or released as the right rim body 72 and the left rim body 42 are brought closer to or apart from each other by the drive of the servomotor 74 which moves the moving member 76 along the axis of the bridge member 75.

The thickness measuring unit 45 includes an ultrasonic measuring unit 58 provided with an ultrasound probe 59 and a displacement means 57 for shifting the measurement position of the ultrasound probe 59. That is, the ultrasonic measuring unit 58 and the ultrasound probe 59 constitute an ultrasonic measuring means for the measurement of the tread thickness D via ultrasonic waves.

The displacement means 57 includes a vertical-direction displacement mechanism 60 and a width-direction displacement mechanism 61 attached to the vertical-direction displacement mechanism 60. The vertical-direction displacement mechanism 60 is constituted by a pair of linear guides, for instance, and the linear guides are placed on the left body 40 and the right body 70, respectively. More specifically, one linear guide and the other linear guide are installed in such a manner as to face each other on the wall faces 40a and 70a, respectively, of the left body 40 and the right body 70 facing each other. The linear guides are each provided with a rail 60A, a slider 60B moving along the rail 60A, and a servo motor 60C serving as the drive source of the slider 60B. The linear guides are secured to the respective wall faces 40a and 70a such that the extension direction of the rails 60A, 60A is the vertical direction and are placed on the rails 60A, 60A such that the sliders 60B, 60B face each other with the lines connecting the sliders 60B, 60B held horizontal. The servo motors 60C are driven synchronously in response to the signal outputted by the measurement control unit 100 to be discussed later, thereby moving the sliders 60B vertically up and down along the rails 60A.

The width-direction displacement mechanism 61 is secured in such a manner as to bridge between the sliders 60B, 60B of the vertical-direction displacement mechanism 60. The width-direction displacement mechanism 61 employs a linear guide as with the vertical-direction displacement mechanism 60, and a rail 61A, which constitutes the linear guide, is secured to the sliders 60B, 60B. The linear guide is provided with a servomotor 61C which serves as the drive source for the slider 61B moving on the rail 61A. The servo motor 61C is driven in response to the signal outputted from the measurement control unit 100 to be discussed later, thereby moving the slider 61B along the rail 61A in the tire width direction.

Secured to the slider 61B of the width-direction displacement mechanism 61 are a probe support arm 62 to which the ultrasound probe 59 is attached and a laser sensor 63 which is the shape measuring means 46.

The probe support arm 62 consists of a horizontal extension portion 62A that extends horizontally from the slider 61B, a clearance portion 62B that extends obliquely downward to evade interference with the tire T and the water tank 31, and a probe support portion 62C that again extends horizontally. And the end of the probe support portion 62C extends closer to a position vertically below the axis connecting the left main spindle 41 and the right main spindle 71. Attached to the end of the probe support portion 62C is the ultrasound probe 59 which is connected to the ultrasonic measuring unit 58 (see FIG. 12).

Figure 6:
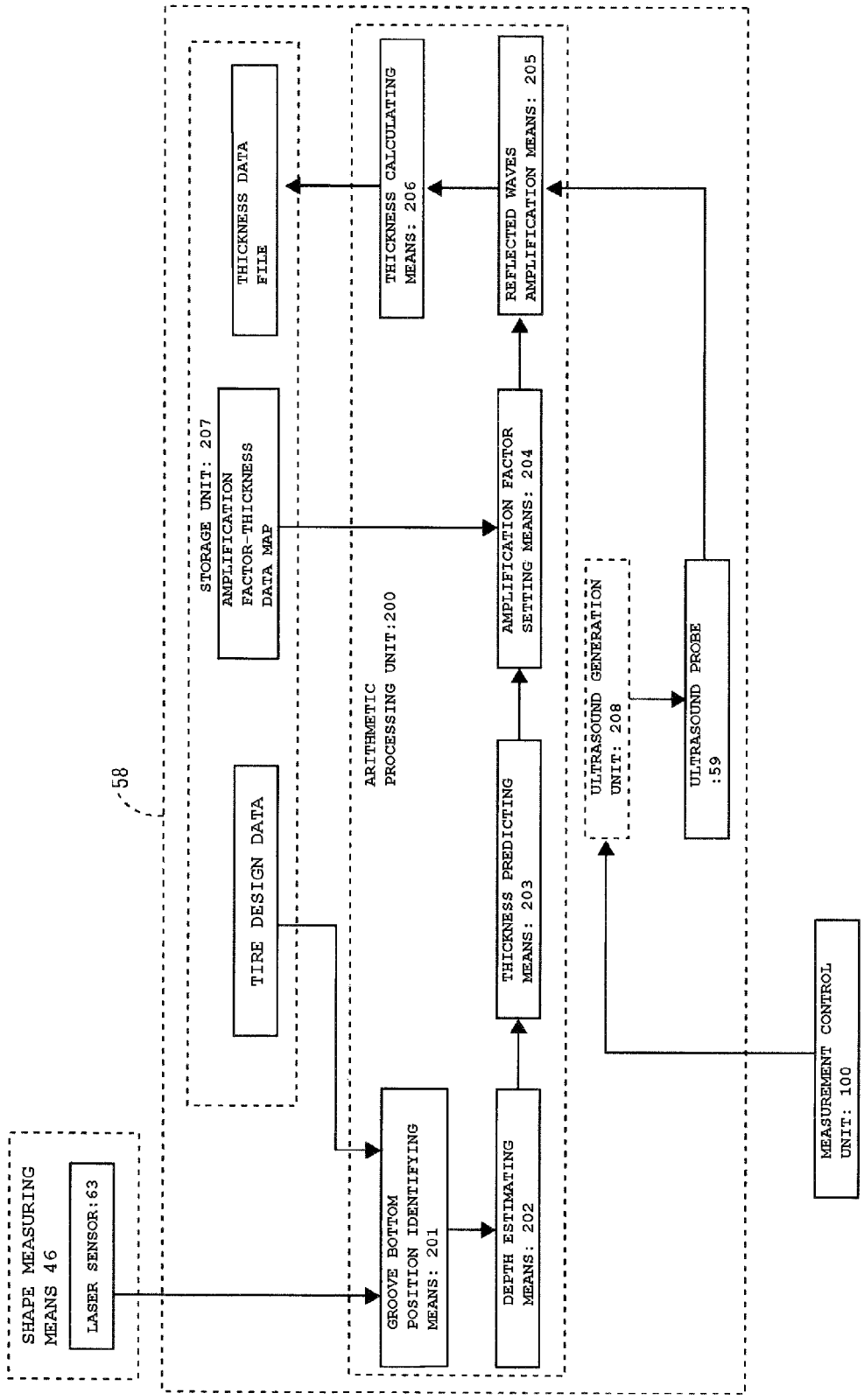
FIG. 6 is a block diagram showing a configuration of an ultrasonic measuring unit.

FIG. 6 is a block diagram showing a configuration of an ultrasonic measuring unit 58.

The ultrasonic measuring unit 58 is a computer for controlling the operation of ultrasonic measurement. The ultrasonic measuring unit 58, which includes CPU as arithmetic processing means, ROM, RAM, and HDD as storage means, and interface as communication means, controls the operation of ultrasonic measurement according to the program stored in the storage means. Also, the ultrasonic measuring unit 58 is equipped with display means such as a monitor and input means such as a keyboard and a mouse.

The ultrasonic measuring unit 58, which is located within the left body 40, for instance, includes an arithmetic processing unit 200, a storage unit 207, and an ultrasound generation unit 208 and has the ultrasound probe 59 connected thereto.

The arithmetic processing unit 200 includes a groove bottom position identifying means 201, a depth estimating means 202, a thickness predicting means 203, an amplification factor setting means 204, a reflected waves amplification means 205, and a thickness calculating means 206.

Figure 7:
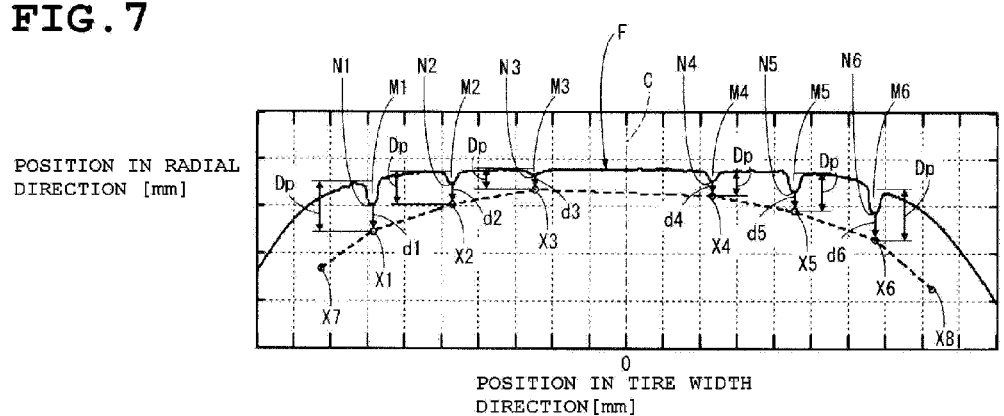
FIG. 7 is a diagram showing a profile F of a tread surface Ts.

FIG. 7 is a diagram showing a profile F of a tread surface Ts obtained by the shape measuring means 46.

The groove bottom position identifying means 201 identifies the positions of the groove bottoms N1 to N6 of the grooves M1 to M6 extending circumferentially around the tire from the profile F of a tread surface Ts obtained by the shape measuring means 46 to be discussed later. More specifically, the variations in height of the profile F are obtained by differentiating the profile F of the tread surface Ts shown in a solid line in FIG. 7 in the width direction, and the points where the variation in height is zero are identified as the groove bottoms N1 to N6 of the grooves M1 to M6. The measurement center C is set for the profile F.

The depth estimating means 202 estimates virtual belt depths based on the tire design data stored in the storage unit 207 to be discussed later and the positions of the groove bottoms N1 to N6 identified by the groove bottom position identifying means 201.

More specifically, the groove bottoms corresponding to the groove bottoms N1 to N6 identified from the profile F by the groove bottom position identifying means 201 are detected from the tire design data. Then the depths from the groove bottoms detected from the tire design data to the points where the straight lines radially extending from the groove bottoms intersect with the radially outermost belt surface are calculated, respectively. These depths are now set as d1 to d6 from the groove bottoms N1 to N6 to the belt surface 94a in the actual tire T. The positions of these set depths d1 to d6 are then set as points X1 to X6 in the profile F. Next, the positions of both end portions of the belt are detected from the relationship between the depths from the groove bottoms detected from the tire design data to the belt surface and the position of the radially outermost belt in the tire design data, and the detected positions of both end portions are set as points X7 and X8 in the profile F. Then, a virtual belt corresponding to the belt 94 is set by connecting the points X1 to X8 with a line, and the positions of the virtual belt are estimated as the depths of the belt 94 from the groove bottoms N1 to N6. Note that the tire design data will be explained in detail in the description of the storage unit 207 later.

The thickness predicting means 203 calculates predicted thicknesses Dp based on the depths to the belt surface 94a estimated from the relationship between the profile F of the tread surface Ts measured by the shape measuring means 46 and the depths d1 to d6 from the groove bottoms N1 to N6 to the belt surface 94a estimated by the depth estimating means 202. More specifically, virtual tread surface corresponding to the groove bottoms N1 to N6 are set by interpolation using the values of the tread surface Ts before and after the formation of the grooves M1 to M6. This is done because there is no tread surface Ts corresponding to the groove bottoms N1 to N6 in the profile F measured by the shape measuring means 46. Now the predicted thicknesses Dp from the tread surface Ts to the belt surface 94a are set from the radial positions of the virtual tread surfaces with respect to the positions of the groove bottoms N1 to N6 and the radial position of the belt surface 94a estimated by the depth estimating means 202.

The amplification factor setting means 204 sets amplification factors for amplification of received reflected waves when an ultrasonic measurement is actually done with the ultrasound probe 59. More specifically, the amplification factor setting means 204 sets predicted thicknesses Y corresponding to the measurement positions set in the tire width direction individually based on the predicted thicknesses Dp predicted by the thickness predicting means 203 and set amplification factors corresponding to the predicted thicknesses Y individually from an amplification factor-thickness data map to be discussed later. Note that the amplification factor-thickness data map will be explained in detail in the description of the storage unit 207 later.

The reflected waves amplification means 205 amplifies the reflected waves received by the ultrasound probe 59 by amplification factors set by the amplification factor setting means 204 and outputs the amplified reflected waves to the thickness calculating means 206.

The thickness calculating means 206 calculates the tread thickness D based on the amplified reflected waves. To be more specific, the thickness calculating means 206 detects a first peak P of reflected waves reflected from the tread surface Ts and a second peak Q of reflected waves reflected from the belt surface 94a from the waveform of the reflected waves amplified by the reflected waves amplification means 205, calculates a time difference between the first peak P and the second peak Q, and calculates the tread thickness D by multiplying the propagation speed of ultrasonic waves in the tread rubber by the time difference. Then the thickness calculating means 206 outputs the calculation results to the thickness data file of the storage unit 207 and at the same time causes a display on the monitor of the measurement control unit 100.

The storage unit 207 stores, in the thickness data file, the tire design data, the pre-created amplification factor-thickness data map, the amplification factors at the respective measurement positions set by the amplification factor setting means 204, the original waveforms of the reflected waves reflected at the respective measurement positions in an ultrasonic measurement, and the tread thickness D calculated by the thickness calculating means 206.

The tire design data are drawing data for the design of a tire T of which the tread thickness D is measured with the tread thickness measuring apparatus 1. The data to be stored in the storage unit 207 in advance are the data on the tire T for tread thickness measurement according to sizes and types.

The tire design data to be stored in the storage unit 207 are so constructed that they, at least, include the depths from the groove bottoms to the outermost belt surface, the width dimensions of the outermost belt, and the radial thicknesses from the outermost belt to the tread surface Ts.

Figure 8:
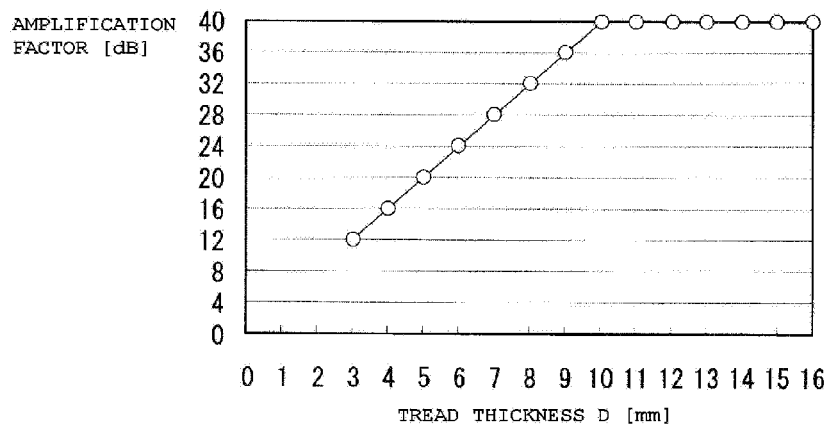
FIG. 8 is a graph showing an example of an amplification factor-thickness data map.

FIG. 8 is a graph showing an example of an amplification factor-thickness data map.

The amplification factor-thickness data map to be stored is a graph as shown in FIG. 8. The amplification factor-thickness data map represents optimum amplification factors for the tread thickness D at different measurement positions which have been determined in advance by actually emitting ultrasonic waves and receiving the reflected waves at random positions of the tire T for tread thickness measurement and changing the amplification factor for the received reflected waves.

In preparing an amplification factor-thickness data map, points at which the thickness is predicted to vary in the tire width direction are selected, like points A1 to A5 in FIG. 1, and ultrasonic waves are sent and the reflected waves are received at the points A1 to A5. FIG. 9 shows the waveforms of reflected waves received at point A1 with the amplification factor increased incrementally by 10 dB. Also, FIG. 10 shows the waveforms of reflected waves received at point A3 with the amplification factor varied the same way. Also, FIG. 11 shows the waveforms of reflected waves received at point A2, point A4, and point A5, respectively, by amplifying the reflected waves by different amplification factors to achieve a predetermined detection intensity.

Figure 9A:
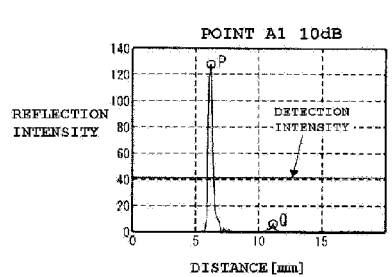
FIG. 9 is diagrams showing waveforms with the amplification factor of reflected waves changed.
Figure 9B:
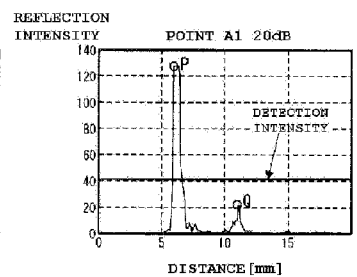
Figure 9C:
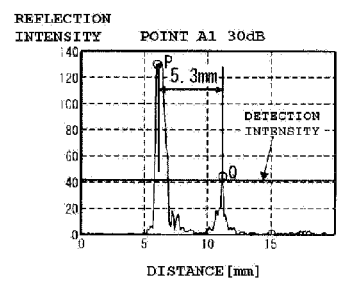
Figure 9D:
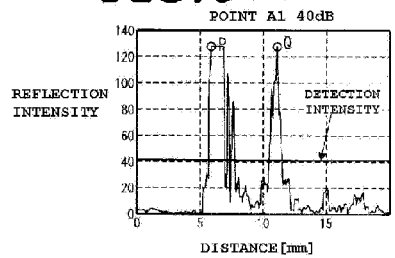
Figure 9E:
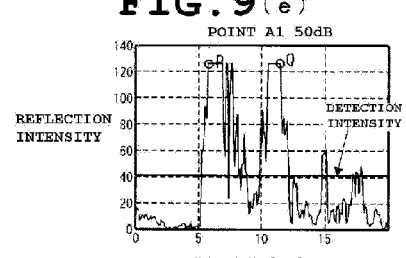

At point A1, as shown in FIG. 9A, with the received reflected waves amplified by an amplification factor of 10 dB, the second peak Q makes its appearance in addition to the first peak P of the reflected waves reflected from the tread surface Ts. Further, as shown in FIGS. 9B to 9E, with the amplification factor increased incrementally by 10 dB, the waveforms other than the first peak P and the second peak Q are seen making their appearances. However, it is possible to consider the amplified waveforms other than the first peak P and the second peak as noises in the thickness measurement. Accordingly, in the present embodiment, the amplification factor of 30 dB, as shown in FIG. 9C, is employed, at which the reflection intensity of the second peak Q of the amplified reflected waves exceeds 40 as a result of incremental increase of the amplification factor. Hence, at point A1, the amplification factor is set at 30 dB when the tread thickness D is 5.3 mm as shown in FIG. 9C.

Figure 10A:
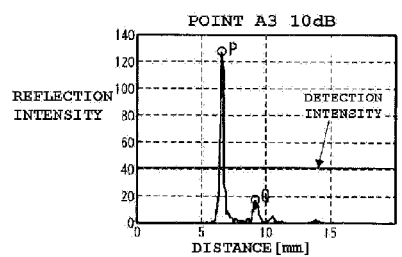
FIG. 10 is diagrams showing waveforms with the amplification factor of reflected waves changed.
Figure 10B:
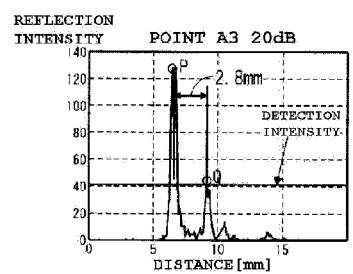
Figure 10C:
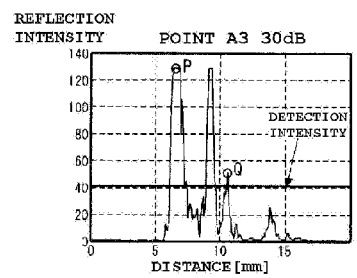
Figure 10D:
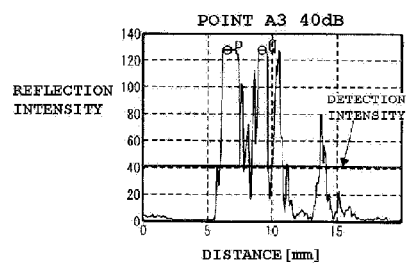
Figure 10E:
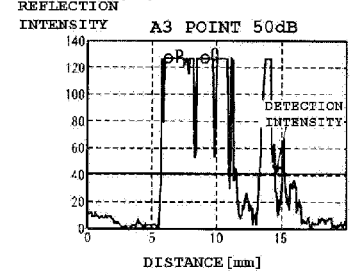

Also, at point A3, as shown in FIG. 10A, with the received reflected waves amplified by an amplification factor of 10 dB, the second peak Q makes its appearance in addition to the first peak P of the reflected waves reflected from the tread surface Ts. Further, as shown in FIGS. 10B to 10E, with the amplification factor increased incrementally by 10 dB, the waveforms other than the first peak P and the second peak Q are seen making their appearances. However, as with point A, it is possible to consider the amplified waveforms other than the first peak P and the second peak as noises in the thickness measurement. Accordingly, the amplification factor of 20 dB, as shown in FIG. 10B, is employed, at which the reflection intensity of the second peak Q of the amplified reflected waves exceeds 40 as a result of incremental increase of the amplification factor. Hence, at point A3, the amplification factor is set at 20 dB when the tread thickness D is 2.8 mm as shown in FIG. 10B.

Figure 11A:
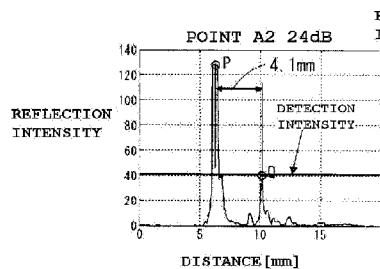
FIG. 11 is diagrams showing waveforms after the amplification of reflected waves by set amplification factors.
Figure 11B:
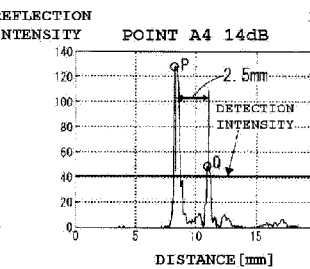
Figure 11C:
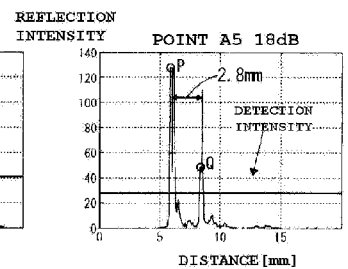

At points A2, A4, and A5, too, a search is made for an amplification factor when the reflection intensity of the second peak Q exceeds 40 by changing the amplification factor for the reflected waves in the same way. Thus, at point A2, the amplification factor is set at 24 dB when the tread thickness D is 4.1 mm as shown in FIG. 11A. At point A4, the amplification factor is set at 14 dB when the tread thickness D is 2.5 mm as shown in FIG. 11B. And at point A5, the amplification factor is set at 18 dB when the tread thickness D is 2.8 mm as shown in FIG. 11E.

As described above, an amplification factor-thickness data map is created in advance by ultrasonic measurements in which a search is made for optimum amplification factors for reflected waves relative to different tread thicknesses D.

Figure 12A:
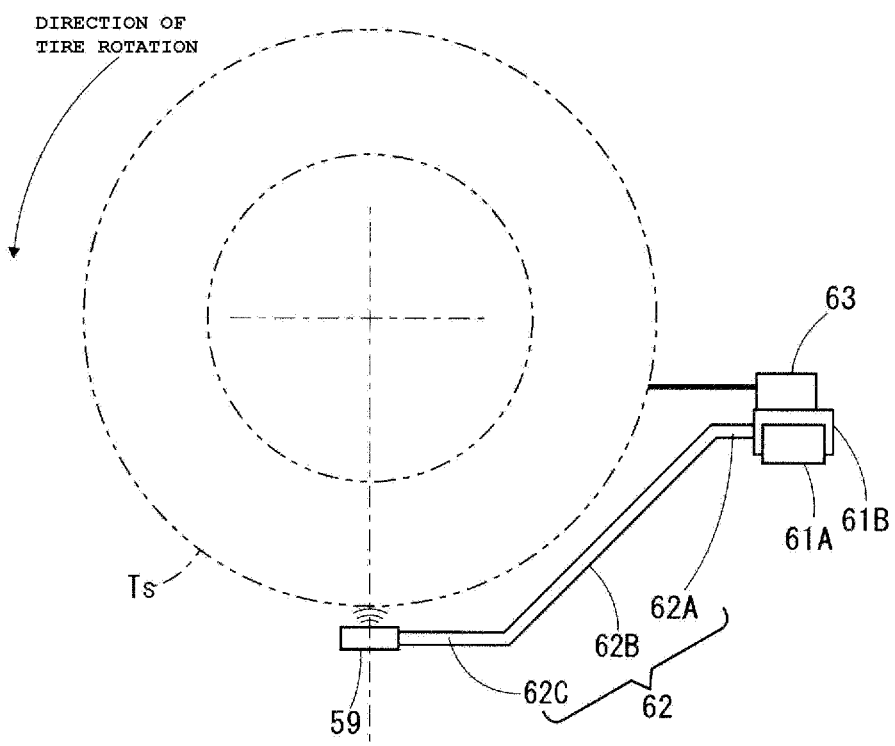
FIG. 12 is a conceptual diagram of tread thickness measurement and a partially enlarged view of measurement.
Figure 12B:
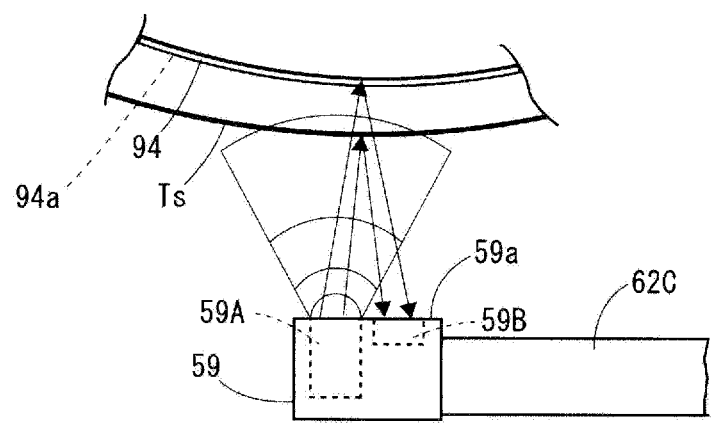

FIG. 12A is a conceptual diagram of measurement by an ultrasound probe 59 and a laser sensor 63 attached to a slider 61B. FIG. 12B is a partially enlarged view of measurement by the ultrasound probe 59 attached to the probe support portion 62C.

The ultrasonic measuring unit 58, which is connected to the measurement control unit 100, operates in response to the signal outputted from the measurement control unit 100. In other words, the ultrasonic measuring unit 58 causes the ultrasound generation unit 208 to generate ultrasonic waves in response to the signal outputted by the measurement control unit 100. More specifically, the ultrasonic measuring unit 58 causes the emitter 59A of the ultrasound probe 59 to emit ultrasonic waves and outputs the reflected waves received by the receiver 59B to the reflected waves amplification means 205. The measurement of the tread thickness D is performed, for example, at a total of 3000 points, namely, 40 points in the width direction and 75 points in the circumferential direction.

The ultrasound probe 59 is a non-contact probe, for instance. The ultrasound probe 59 is secured to the probe support portion 62C such that the measurement position is located vertically below the axis connecting the left main spindle 41 and the right main spindle 71 with the measuring surface 59a facing the tread surface Ts. The ultrasound probe 59, having the emitter 59A and the receiver 59B in the same plane, emits ultrasonic waves from the emitter 59A in the direction of the tread surface Ts and receives the reflected waves reflected from the tread surface Ts and other constituent members of the tire T such as the belt 94 by the receiver 59B. In an ultrasonic measurement, the ultrasound probe 59 is set with a predetermined distance between the measuring surface 59a and the tread surface Ts by driving the displacement means 57. That is, the ultrasound probe 59 performs an ultrasonic measurement by moving in the tire width direction while maintaining a predetermined distance from the tread surface Ts as measured by the laser sensor 63 of the shape measuring means 46 to be discussed later.

Thus, the ultrasonic waves emitted from the emitter 59A of the ultrasound probe 59 can be propagated in a substantially normal direction to the tread surface Ts via the liquid 34. Hence, it is possible to direct the ultrasonic waves to the belt surface 94a with greater accuracy and receive the ultrasonic waves reflected from there by the receiver 59B. The ultrasonic waves emitted vertically to the tread surface Ts are propagated through the liquid 34 and reflected from the tread surface Ts, and the reflected ultrasonic waves are received by the receiver 59B. Then the ultrasonic waves propagated into the tread are reflected from the belt surface 94a located in the radially outermost position of the belt layer and received by the receiver 59B. Next, the reflected waves received at the measurement positions are amplified by the preset amplification factors by the reflected waves amplification means 205 of the ultrasonic measuring unit 58, and the thicknesses from the tread surface Ts to the outermost belt surface 94a are calculated by the thickness calculating means 206. Accordingly, the measurement of the tread thickness D can be accomplished with accuracy.

The shape measuring means 46 is secured to the slider 61B in the same position as the probe support arm 62. The shape measuring means 46, which is, for instance, a laser sensor 63, has its direction of measurement on the side where the probe support arm 62 extends and sends laser beam approximately in a horizontal direction. With the laser sensor 63 secured to the slider 61B in the same position as the probe support arm 62, it is possible to set the position for shape measurement by the laser sensor 63 and the position for ultrasonic measurement by the ultrasound probe 59 in the same position in the tire width direction. Also, the profile of the tread surface Ts can be measured by moving the laser sensor 63, together with the slider 61B, in the tire width direction while the laser beam from the laser sensor 63 is applied onto the tread surface Ts of the tire T held by the left and right rim bodies 42 and 72. It is to be noted that the external shape of a tire including the profile of the tread surface Ts can be measured with the laser sensor 63 moved between one tire side and the other tire side while the laser beam is applied onto the tread surface Ts. Therefore, it is possible to set the width center of the tire T and the width range of the tread surface Ts to be measured in the ultrasonic measurement. The profile measured by the shape measuring means 46 is outputted to the storage unit 130 of the measurement control unit 100 and the arithmetic processing unit 200 of the ultrasonic measuring unit 58.

Figure 13A:
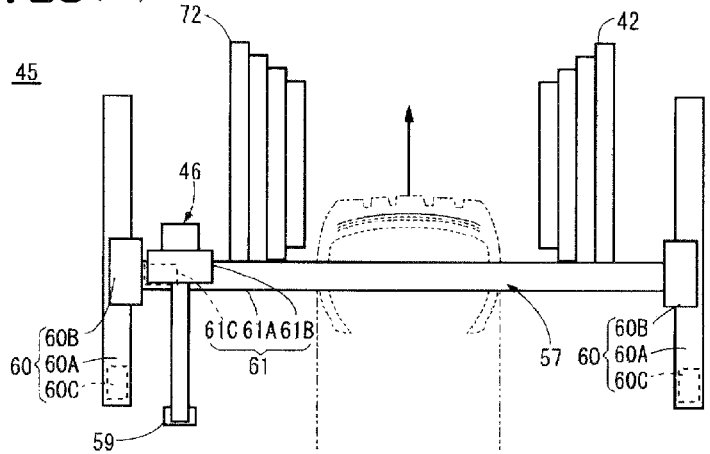
FIG. 13 is diagrams showing a measurement operation with an ultrasound probe.
Figure 13B:
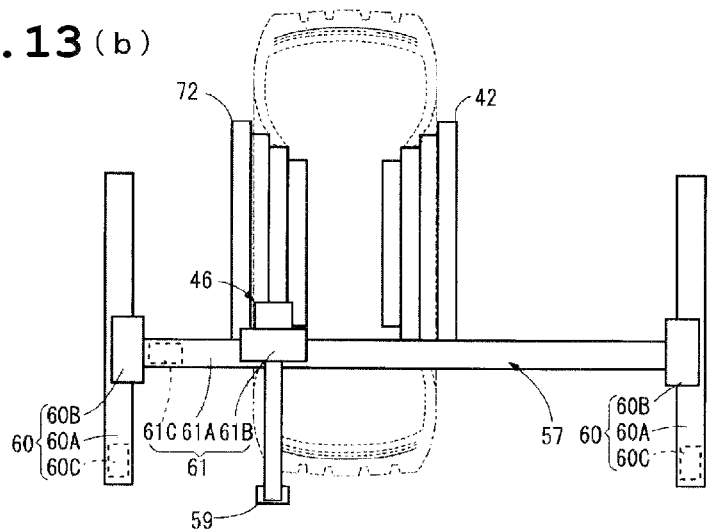
Figure 13C:
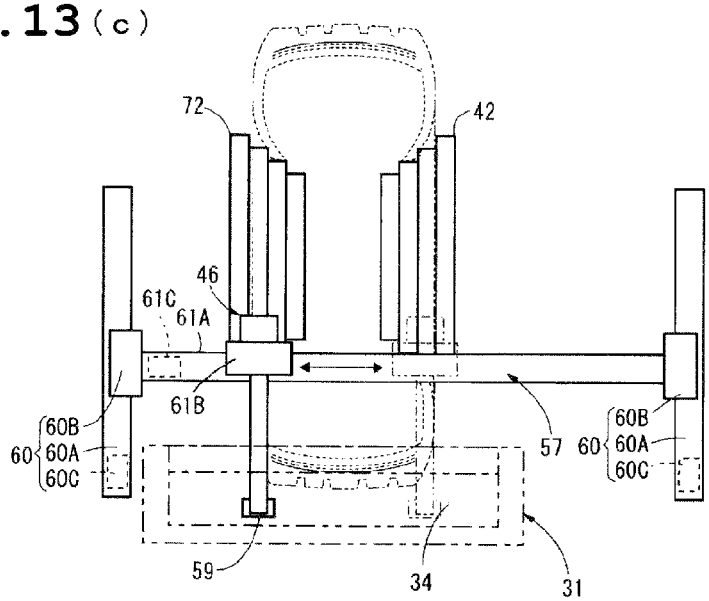

FIGS. 13A, 13B, and 13C are diagrams showing an operation of measurement of the tread thickness D using an ultrasound probe 59.

As shown in FIG. 13A, when the measurement is not being done, like when the tire T is being held or released by the left and right rim bodies 42 and 72, the ultrasound probe 59 is placed in a standby position on the side of the left body 40 by the operation of the displacement means 57. Then, as shown in FIG. 13B, with the tire T held by the left and right rim bodies 42 and 72, the ultrasound probe 59 is moved to the measurement preparatory position where the measuring surface 59a is held at a predetermined distance from the tread surface Ts at one end side of the tread surface Ts. Then, as shown in FIG. 13C, the water tank 31 is lifted in preparation for an ultrasonic measurement and the ultrasonic measurement is started when both the tread surface Ts and the ultrasound probe 59 are immersed in the liquid 34. In the ultrasonic measurement, the measurement of the tread thickness D in the tire width direction at one circumferential position is carried out with the ultrasound probe 59 shifted in the width direction while keeping a predetermined distance to the tread surface Ts by the control of the displacement means 57. It should be noted that when there is a change in the size of the tire T for the measurement of the tread thickness D, adjustments can be made by driving the displacement means 57 to create the same condition for the distance between the ultrasound probe 59 and the tread surface Ts.

The measurement control unit 100 is a computer for controlling the operation of the tread thickness measuring apparatus 1. The measurement control unit 100, which includes CPU as arithmetic processing means, ROM, RAM, and HDD as storage means, and interface as communication means, controls the operation of measurement of the tread thickness D according to the program stored in the storage means. Also, the measurement control unit 100 is equipped with display means such as a monitor and input means such as a keyboard and a mouse.

Figure 14:
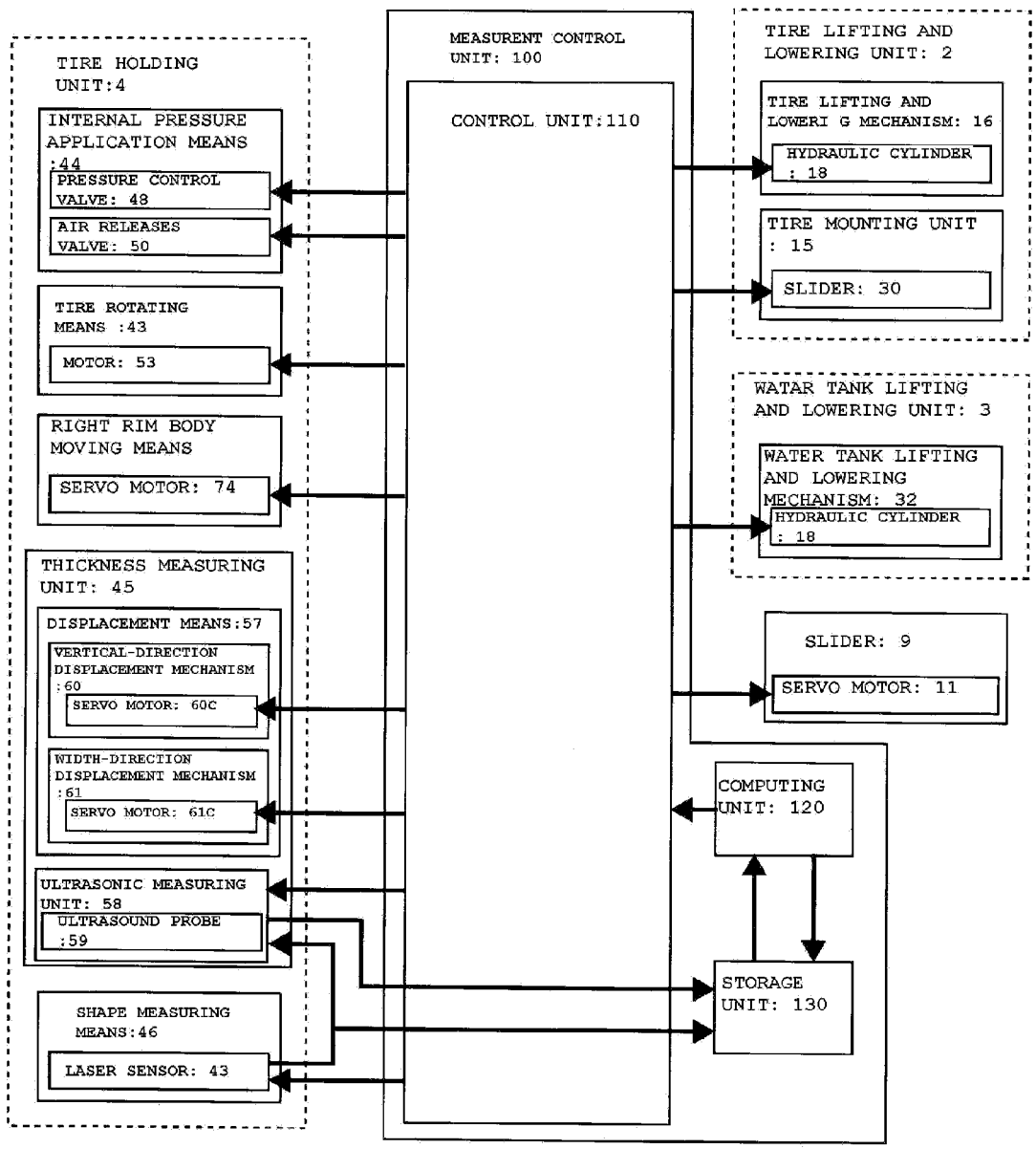
FIG. 14 is a block diagram showing control by a measurement control unit.
Figure 15:
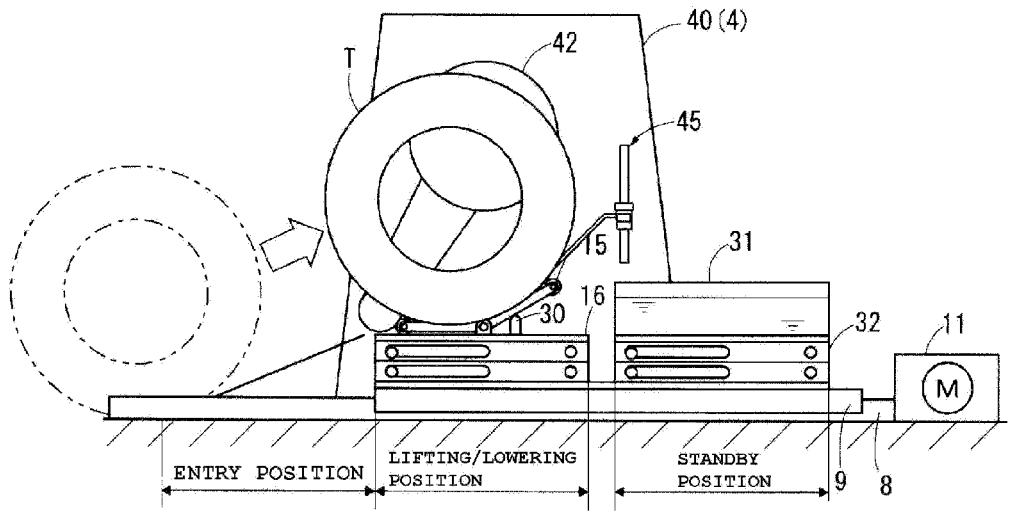
FIG. 15 is measurement process diagrams for the measurement of the tread thickness.
Figure 15:
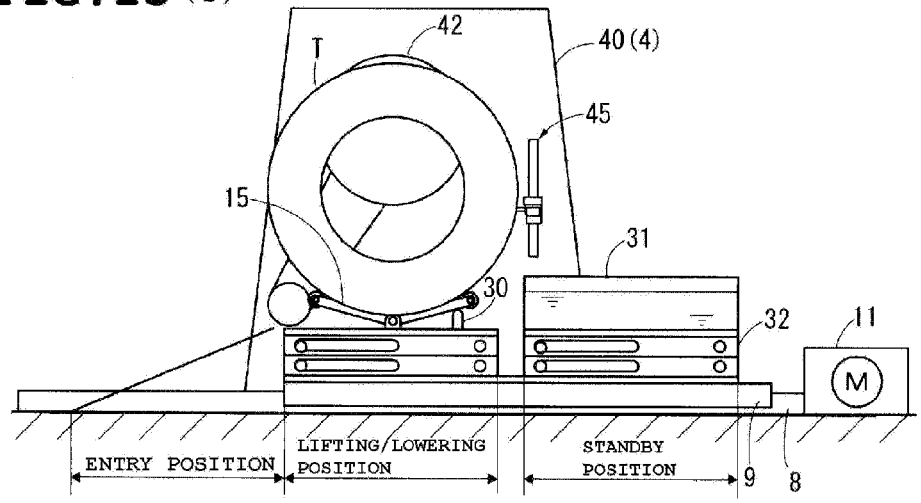
Figure 15:
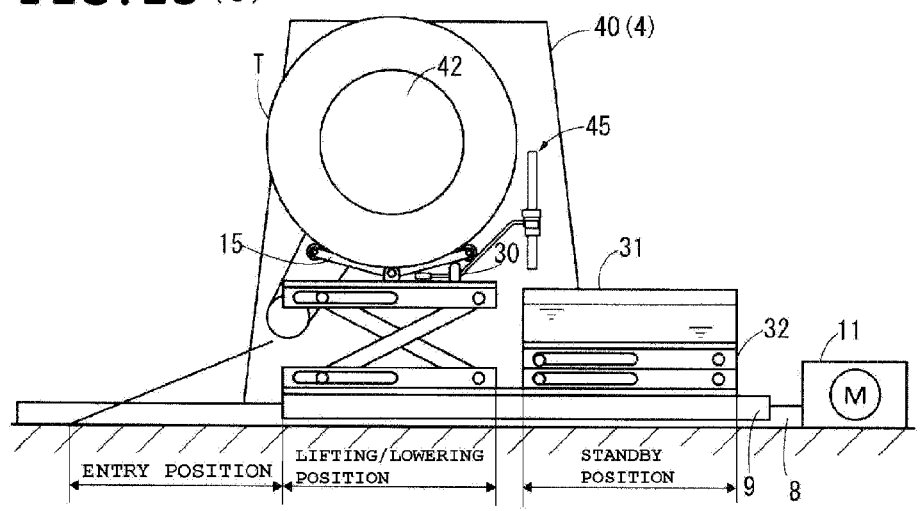

FIG. 14 is a control block diagram of a measurement control unit 100. Hereinbelow, a description is given of the control operation for the tread thickness measuring apparatus 1 by the measurement control unit 100. The measurement control unit 100 includes a control unit 110, a computing unit 120, and a storage unit 130.

The control unit 110 controls the lifting and lowering of the tire T to and from the tire holding position by controlling the extension and retraction of the hydraulic cylinder 18 of the tire lifting and lowering mechanism 16 of the tire lifting and lowering unit 2 and also controls the movement of the slider 30 which controls the inclination of the tire mounting unit 15. Also, the control unit 110 controls the lifting and lowering of the water tank 32 by controlling the extension and retraction of the hydraulic cylinder 18 of the water tank lifting and lowering mechanism 32 of the water tank lifting and lowering unit 3. Also, the control unit 110 controls the positions of the tire lifting and lowering unit 2 and the water tank lifting and lowering unit 3 by controlling the rotation of the servo motor 11 which is the drive source of the slider 9 for the movement of the tire lifting and lowering unit 2 and the water tank lifting and lowering unit 3.

Also, the control unit 110 controls the holding and release of the tire T by bringing the right rim body 72 closer to or apart from the left rim body 42 by controlling the drive of the servo motor 74 for moving the moving member 76 of the rim body moving means 73, the application of internal pressure into the tire T held by the left and right rim bodies 42 and 72 by controlling the operation of the pressure control valve 48 of the internal pressure application means 44, the release of the internal pressure applied in the tire T by controlling the operation of the air release valve 50, and the rotation of the tire T by controlling the operation of the motor 53 of the tire rotating means 43.

Also, the control unit 110 controls the movement of the ultrasound probe 59 to the standby position, the movement thereof to the measurement preparatory position at the predetermined distance from the tread surface Ts, and the movement thereof in the tire width direction for ultrasonic measurement while keeping a constant distance from the tread surface Ts by controlling the servo motor 60C of the vertical-direction displacement mechanism 60 and the servo motor 61C of the width-direction displacement mechanism 61 of the displacement means 57 of the thickness measuring unit 45, and controls the operation of the ultrasonic measuring unit 58 to enable the emission of ultrasonic waves from the ultrasound probe 59.

Also, the control unit 110 controls the operation for shape measurement by the laser sensor 63 of the shape measuring means 46 by controlling the servo motor 60C of the vertical-direction displacement mechanism 60 and the servo motor 61C of the width-direction displacement mechanism 61 of the displacement means 57 of the thickness measuring unit 45.

The computing unit 120 calculates the motion values of the ultrasound probe 59 by the displacement means 57 of the thickness measuring unit 45 along the profile F of the tread surface Ts stored in the storage unit 130.

The storage unit 130 stores the profile F measured by the shape measuring means 46.

Hereinbelow, a description is given of the steps of measurement of the tread thickness D of the tire T by the tread thickness measuring apparatus 1 with reference to FIGS. 15 to 18.

The measuring steps start with the holding of a tire T for tread thickness measurement by the tire holding unit 4 of the tread thickness measuring apparatus 1. Firstly, as shown in FIG. 15A, the tire mounting unit 15 is inclined toward the tire entry side by moving the slider 30 of the tire lifting and lowering unit 2 in preparation for the carry-in of the tire T by the worker. Then the worker rolls the tire T along the slope of the entry path and places it on the tire mounting unit 15. Next, as shown in FIG. 15B, the slider 30 is moved until the tire mounting unit 15 is made level so that the tire T stands on its own. Then, as shown in FIG. 15C, the tire mounting unit 15 is raised by retracting the hydraulic cylinder 18 of the tire lifting and lowering mechanism 16, thereby moving the wheels 21A and 22A of the link members 21 and 22 along the elongate holes 19B and 20B. To be more specific, the tire T is lifted to a height where the center of the tire T is aligned with the axis of the left and right rim bodies 42 and 72.

Next, the moving member 76 is moved toward the left body 40 and thus the right rim body 72 is brought closer to the left rim body 42, thereby having the bead portions of the tire T come in close contact with a step of the stepped peripheries 51 and 81 of the left and right rim bodies 42 and 72. Then the air is supplied into the tire T by operating the internal pressure application means 44 until the internal pressure reaches the specified service pressure for the tire. As a result, the tire T is held by the left and right rim bodies 42 and 72 in the service form.

Next, as shown in FIG. 16A, the tire mounting unit 15 is lowered to the lowest position by extending the hydraulic cylinder 18 of the tire lifting and lowering mechanism 16. Then the ultrasound probe 59 is moved to the measurement preparatory position by driving the vertical-direction displacement mechanism 60 and the width-direction displacement mechanism 61 of the thickness measuring unit 45 (see FIG. 13A). In this position, the ultrasound probe 59 does not collide with the tire T even if it is moved in the tire width direction. Next, by driving the width-direction displacement mechanism 61 only, the laser sensor 63 of the shape measuring means 46 is moved in the tire width direction and the shape of the tread surface Ts is measured. After this, the slider 61C of the width-direction displacement mechanism 61 is returned to the standby position of the ultrasound probe 59. The profile F measured by the laser sensor 63 is outputted to the computing unit 120 of the measurement control unit 100 and the arithmetic processing unit 200 of the ultrasonic measuring unit 58, where the measuring range for the measurement of the tread thickness D by the ultrasonic measurement and the amplification factors for the reflected waves received in the ultrasonic measurement are set. At the arithmetic processing unit 200 of the ultrasonic measuring unit 58, the positions of the groove bottoms N1 to N6 of the grooves M1 to M6 extending circumferentially around the tire are identified from the profile F by the groove bottom position identifying means 201. Next, the depths from the groove bottoms N1 to N6 to the belt surface 94a are estimated by the depth estimating means 202, based on the tire design data stored in the storage unit 207 and the positions of the groove bottoms N1 to N6 identified by the groove bottom position identifying means 201. Then the predicted thicknesses Dp from the tread surface Ts to the belt surface 94a are calculated by the thickness predicting means 203, based on the profile F of the tread surface Ts measured by the shape measuring means 46 and the depths of the belt surface 94a from the groove bottoms N1 to N6 estimated by the depth estimating means 202. Then, at the amplification factor setting means 204, the predicted thicknesses Dp corresponding to the measurement positions set in the tire width direction are set individually based on the predicted thicknesses Dp predicted by the thickness predicting means 203, and the amplification factors corresponding to these predicted thicknesses Dp are set individually from the amplification factor-thickness data map. And the thus set amplification factors are outputted to the reflected waves amplification means 205.

Next, after the slope is lowered, as shown in FIG. 16B, the sliders 9 are moved to the tire entry side following the signal outputted to the servo motors 11 for moving the tire lifting and lowering unit 2 and the water tank lifting and lowering unit 3, so that the water tank lifting and lowering unit 3 is moved to the same position as the lifting/lowering position of the tire lifting and lowering unit 2 when the tire T is held by the tire holding unit 4. That is, the sliders 9 are so moved as to replace the tire lifting and lowering unit 2 by the water tank lifting and lowering unit 3. Then, as shown in FIG. 16C, the water tank 31 is lifted by driving the hydraulic cylinder 18 of the water tank lifting and lowering mechanism 32 of the water tank lifting and lowering unit 3. As a result of this lifting operation, the tread surface Ts and the ultrasound probe 59 are immersed in the liquid 34.

Next, the ultrasound probe 59 is moved from the measurement preparatory position to the measurement end position in the tire width direction by driving the width-direction displacement mechanism 61, during which the tread thickness D is measured. In other words, the measurement positions for ultrasonic measurement in the width direction are set from the measuring range for ultrasonic measurement set on the basis of the profile F measured by the shape measuring means 46. At the measurement positions, ultrasonic waves are emitted, and the reflected waves received, as the ultrasound probe 59 is moved from the measurement preparatory position to the measurement end position. The reflected waves at each of the measurement positions are outputted to the measurement control unit 100 via the ultrasonic measuring unit 58. The received reflected waves are amplified by the amplification factor set for each of the measurement positions by the reflected waves amplification means 205, and the amplified reflected waves are outputted to the thickness calculating means 206. At the thickness calculating means 206, the first peak P, which is the peak of reflected waves reflected from the tread surface Ts, and the second peak Q, which is the peak of reflected waves reflected from the belt surface 94a, are detected from the amplified reflected waves. And the time difference between the first peak P and the second peak Q is calculated, and then the tread thickness D is calculated by multiplying the propagation speed of ultrasonic waves through the tread rubber by the time difference. The calculated tread thickness D is outputted to the storage unit 207, and the tread thickness D associated with the measurement position is stored in the storage unit 207.

Next, upon completion of measurement of the tread thickness D in the width direction at one circumferential position of the tire, the tire T is rotated by a predetermined angle, and the tread thickness D in the tire width direction at another circumferential position shifted by the predetermined angle of the tire is measured by again moving the ultrasound probe 59 from the measurement preparatory position to the measurement end position in the tire width direction. The above-described process is repeated for a full circle around the tire, and the measurement of the tread thickness D of the tire is completed.

Figure 17A:
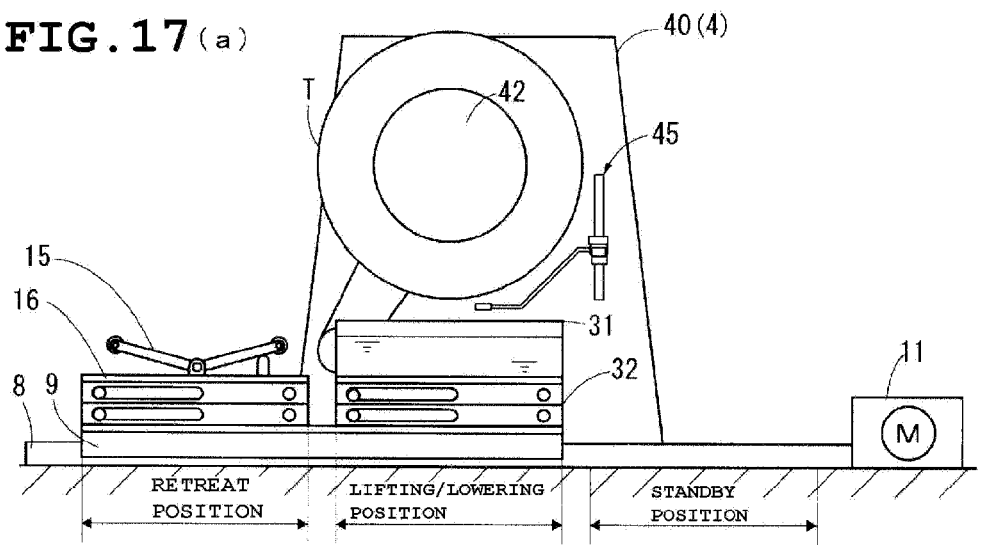
FIG. 17 is measurement process diagrams for the measurement of the tread thickness.
Figure 17B:
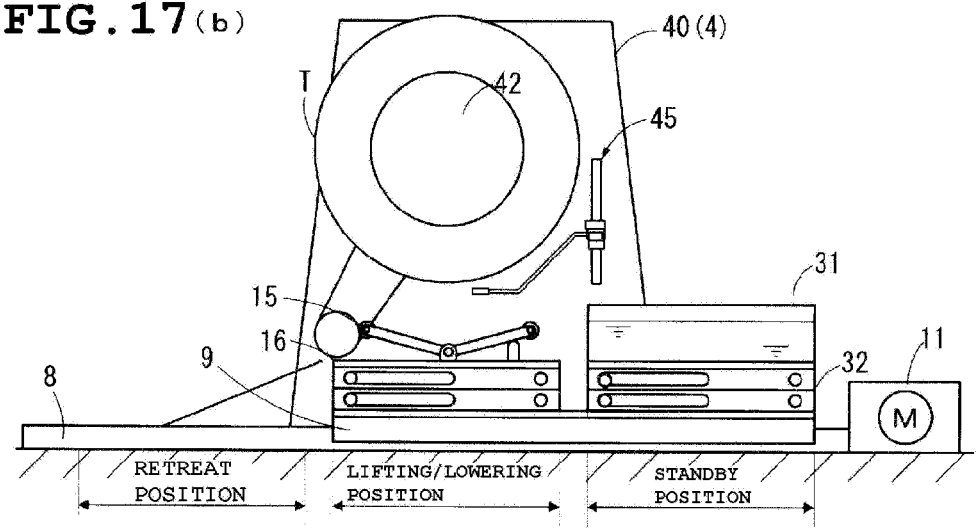
Figure 17C:
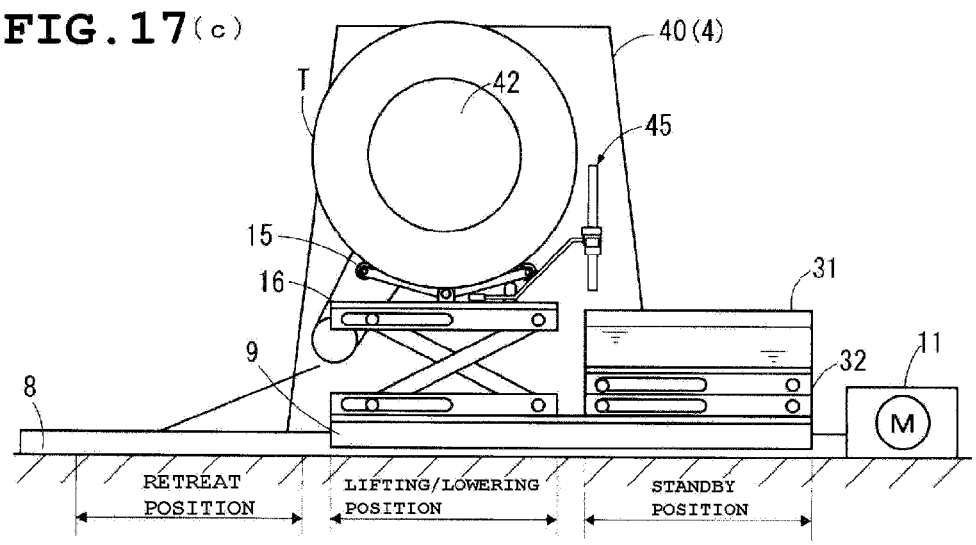

Next, upon completion of measurement of the tread thickness D for a full circle around the tire T, as shown in FIG. 17A, the water tank 31 is lowered to the lowest position by driving the water tank lifting and lowering mechanism 32 of the water tank lifting and lowering unit 3, and then the ultrasound probe 59 is moved to the standby position. Then the air inside the tire T is released by opening the air release valve 50 while the motor 53 of the tire rotating, means 43 is rotated by predetermined revolutions. Then, upon completion of drying of the tire surface Ts, as shown in FIG. 17B, the water tank lifting and lowering unit 3, together with the sliders 9, is moved to the downstream side in the tire entry direction by driving the servo motors 11, thus replacing the water tank lifting and lowering unit 3 by the tire lifting and lowering unit 2. That is, the tire lifting and lowering unit 2 is moved to the position where the water tank lifting and lowering unit 3 has been in the measurement of the tread thickness D. Next, as shown in FIG. 17C, the tire mounting unit 15 is raised by driving the tire lifting and lowering mechanism 16 of the tire lifting and lowering unit 2, and after it has reached the lower surface of the tire, the air is released from within the tire and the right rim body 72 is moved away from the tire T.

Figure 18A:
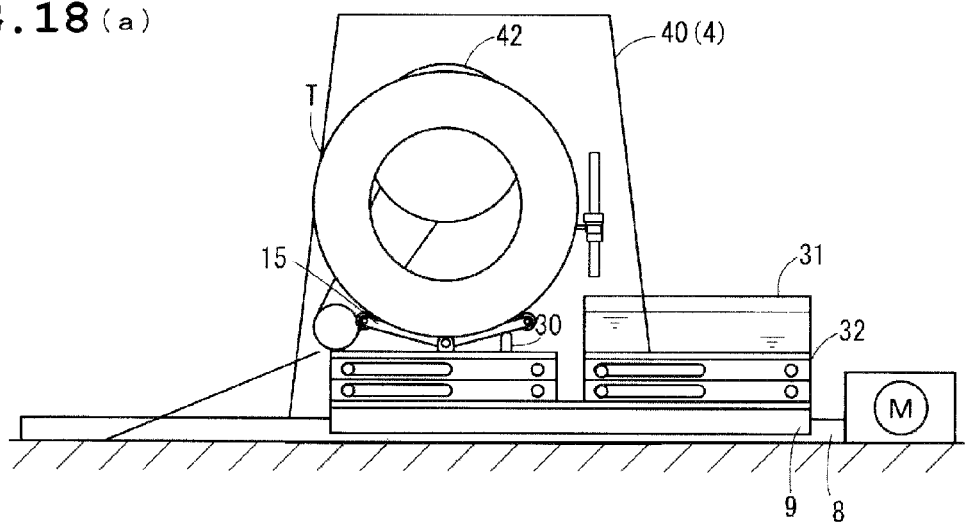
FIG. 18 is measurement process diagrams for the measurement of the tread thickness.
Figure 18B:
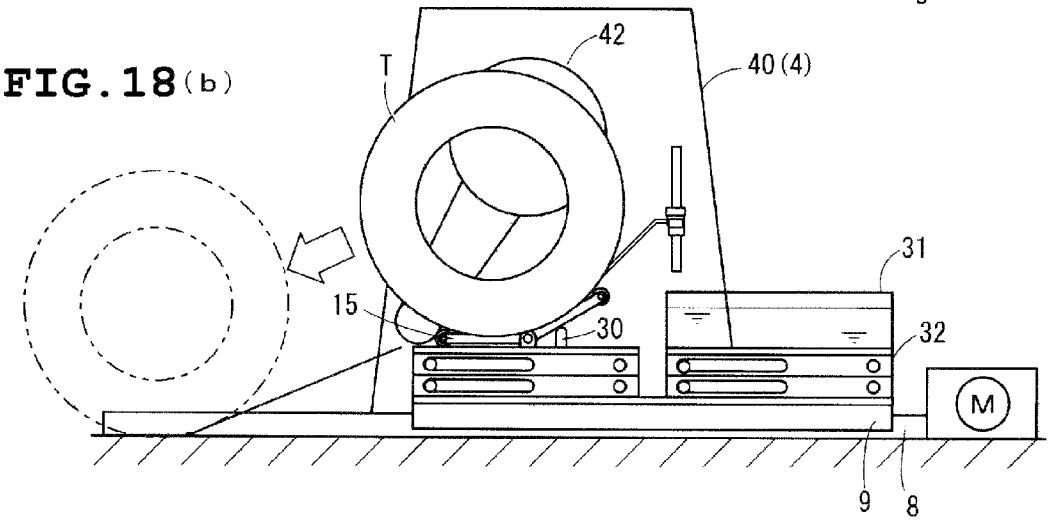

Next, as shown in FIG. 18A, the tire T, supported by the tire mounting unit 15, is lowered to the lowest position by driving the tire lifting and lowering mechanism 16. Then, as shown in FIG. 18B, the slider 30 is shifted to the tire entry side to incline the tire mounting unit 15 toward the tire entry side before the tire T is carried out.

Thus, as explained above, prior to the measurement of the tread thickness D by the ultrasound probe 59, the amplification factors for the received reflected waves are set in correspondence to the rubber thicknesses left in the tread of a used tire. This makes it possible to obtain reflected waves in a reliable manner without attenuation due to the thickness of the rubber. That is, the reflected waves reflected from the tread surface Ts and the reflected waves reflected from the belt surface 94a can be detected accurately by changing the amplification factor for the reflected waves according to the differences in rubber thickness left in the tread. Therefore it is possible to accurately measure the tread thickness D from the tread surface Ts to the belt 94 located in a radially outermost position. Also, the tread thickness D from the tread surface Ts to the belt 94 located in a radially outermost position is measured using ultrasonic waves. Hence, it is possible to accurately measure the tread thickness D from the tread surface Ts to the outermost belt surface 94a irrespective of the type of material used for the belt 94 located in a radially outermost position.

Accordingly, the tread thickness D can be measured with the tread thickness measuring apparatus 1 of the present invention when a tire T is retreaded. By doing so, the amount of buffing can be set correctly without damaging the tire T irrespective of the type of material used for the outermost belt 94. Note that the amount of buffing meant here is the thickness by which the tread is abraded to leave a necessary thickness from the outermost belt 94.

Although the invention has been described by way of an example of a preferred embodiment, the technical scope of the invention should not be considered as limiting. Rather, it is to be understood that various modifications or improvements may be made within the spirit of the invention.

Figure 19A:
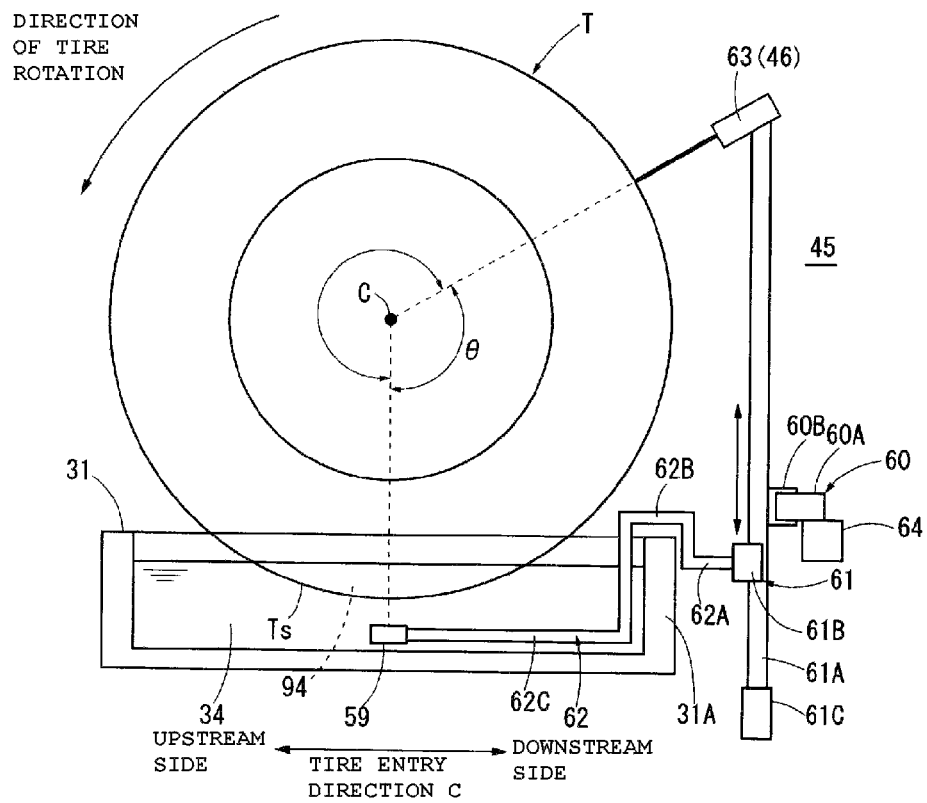
FIG. 19 is schematic structural diagrams showing another embodiment of the thickness measuring unit.
Figure 19B:
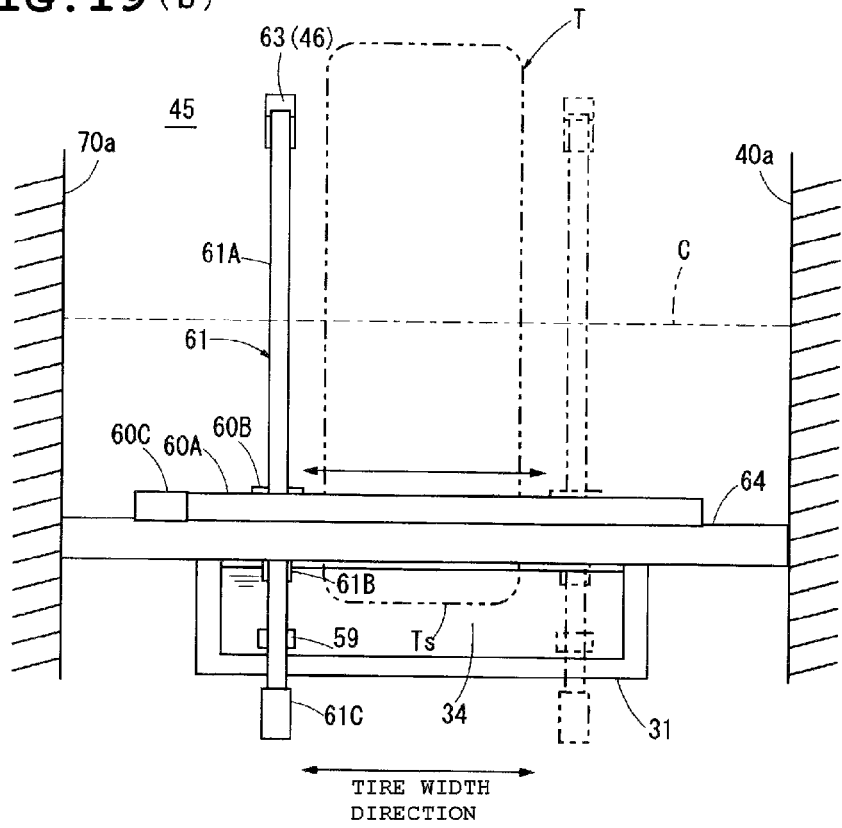

For example, the thickness measuring unit 45 of the tread thickness measuring apparatus 1 may be arranged as shown in FIGS. 19A and 19B. FIG. 19A is a side view of another embodiment of the thickness measuring unit 45 of the tread thickness measuring apparatus 1, and FIG. 19B a plan view thereof. In the following description, the same reference numerals will be used for the structures equal to those of the foregoing embodiment.

As shown in FIGS. 19A and 19B, the thickness measuring unit 45 according to this embodiment is attached to a support member 64 which is bridged between the mutually facing wall faces 40a and 70a of the left body 40 and the right body 70 of the tire holding unit 4. The support member 64, which is a linearly extending bar member, is disposed horizontally at a height where it does not collide with the water tank.

The thickness measuring unit 45 is mainly constructed of an ultrasound probe 59 for measuring the tread thickness D, a width-direction displacement mechanism 60 for moving the ultrasound probe 59 in the tire width direction, a vertical-direction displacement mechanism 61 for moving the ultrasound probe 59 in the direction approaching the tire, and a shape measuring means 46 for measuring the profile of the tire T.

Used as the width-direction displacement mechanism 60 is a linear guide provided with a guide rail 60A, a slider 60B, and a servo motor 60C, for instance. The guide rail 60A is disposed along the extension direction of the support member 64 for a length approximately reaching the wall face 40a of the left body 40 and the wall face 70a of the right body 70 and is provided with a not-shown ball screw mechanism inside. The slider 60B, which is secured to the ball nut of the ball screw mechanism, moves along the guide rail 60A as the ball nut moves along the ball screw. The servo motor 60C is connected to one end of the ball screw of the ball screw mechanism, and the rotative force of the servo motor 60C is communicated to the ball screw. Also, the servomotor 60C, which is connected to the measurement control unit 100, rotates in response to the signal outputted from the measurement control unit 100.

Accordingly, the servo motor 60C, by running in response to the signal outputted from the measurement control unit 100, rotates the ball screw, thereby causing the slider 60B to move along the extension direction of the guide rail 60A.

Used as the vertical-direction displacement mechanism 61 is a linear guide provided with a guide rail 61A, a slider 61B, and a servo motor 61C, for instance. The guide rail 61A is attached to the slider 60B perpendicularly to the extension direction of the guide rail 60A. The guide rail 61A projects vertically in relation to the guide rail 60A. That is, the guide rail 61A is attached to the slider 60B with its extension direction oriented along the vertical direction. Also, the guide rail 61A is provided with a not-shown ball screw mechanism inside. The slider 61B, which is secured to the ball nut of the ball screw mechanism, moves in the vertical direction along the guide rail 61A as the ball nut moves along the ball screw. The servo motor 61C is connected to one end of the ball screw of the ball screw mechanism, and the rotative force of the servo motor 61C is communicated to the ball screw. Also, the servomotor 61C, which is connected to the measurement control unit 100, rotates in response to the signal outputted from the measurement control unit 100.

Accordingly, the servo motor 61C, by running in response to the signal outputted from the measurement control unit 100, rotates the ball screw, thereby causing the slider 61B to move along the extension direction of the guide rail 61A.

Secured to the slider 61B is the probe support arm 62 to which the ultrasound probe 59 is attached. The probe support arm 62 consists of a horizontal extension portion 62A extending horizontally from the slider 61B, a clearance portion 62B striding over the rim 31A of the water tank 31, and a probe support portion 62C again extending horizontally. And the end of the probe support portion 62C extends to a vicinity vertically below the axis C connecting the left main spindle 41 and the right main spindle 71. It should be noted, however, that the probe support arm 62 is not limited to the shape as described above, but it may be in any shape as long as it causes no collision with the water tank 31 or the tire T during the ultrasonic measurement of the tread thickness D. Attached to the end of the probe support portion 62C is the ultrasound probe 59.

The ultrasound probe 59 is attached to the probe support portion 62C such that the measuring surface having the emitter 59A and the receiver 59B comes to the top and the measurement position of the emitter 59A and the receiver 59B is placed approximately on the vertical line passing through the axis C of the left and right main spindles 41 and 71.

In the same way as in the foregoing embodiment, a laser sensor 63 is used as the shape measuring means 46. The laser sensor 63 is attached to the top end of the guide rail 61A such that the laser beam is emitted in a direction parallel with the tire entry direction and intersecting with the axis C of the left and right main spindles 41 and 71. Thus the laser is emitted to the tread surface Ts in a direction coinciding with the radial direction of the tire T held by the tire holding unit 4.

Accordingly, the thickness measuring unit 45 can measure the profile of the tread surface Ts by operating the width-direction displacement mechanism 60 while the laser is emitted to the tread surface Ts from the laser sensor 63 which is the shape measuring means 46. Also, the angle at which laser is emitted by the laser sensor 63 may be so set as to intersect with the vertical line at a known angle θ. By doing so, the profile measured by the laser sensor 63 can be easily associated with the position where the tread thickness D is measured with the ultrasound probe 59. That is, the circumferential position on the tread surface Ts where the profile is measured by the laser sensor 63 stays constant in relation to the position of the tire T where the tread thickness D is measured with the ultrasound probe 59. Hence, by setting the measurement position of the ultrasound probe 59 and the measurement position of the laser sensor 63 in an established manner, it is possible to accurately determine the correspondence relationship between the data of the profile measured by the laser sensor 63 and the tread thickness D measured by the ultrasound probe 59.

Hereinbelow, a description is given of the steps for measuring the tread thickness D in this embodiment. Note that since the operations of the tire lifting and lowering unit 2 and the water tank lifting and lowering unit 3 are identical to those of the foregoing embodiment, the operations related to the measurement only will be explained.

In the present embodiment, the tire T held by the tire holding unit 3 is rotated before the raising of the water tank lifting and lowering unit 3, and the profile of the tread surface Ts is measured by the shape measuring means 46 by moving the shape measuring means 46 in the tire width direction at each of the measurement positions of the tread thickness D set in the circumferential direction of the tread surface Ts. At this time, the ultrasound probe 59 is placed in a standby position where it does not come in contact with the tread surface Ts.

Next, the water tank lifting and lowering unit 3 is raised so that the tread surface Ts is immersed in the liquid 34, and the ultrasound probe 59 is located at a predetermined distance from the tread surface Ts. Then the thickness from the tread surface Ts to the belt surface 94a is measured by the ultrasound probe 59 which is moved in the tire width direction at the measurement position set in the circumferential direction of the tread surface Ts.

Next, upon completion of the measurement of the tread thickness D in the width direction at one of the circumferential positions, the tire T is rotated by a predetermined angle, and again the tread thickness D in the tire width direction at the circumferential position shifted by the predetermined angle is measured by the ultrasound probe 59 which is moved in the tire width direction from the measurement start position to the measurement end position. These steps are repeated full circle on the tire to complete the measurement of the tread thickness D of a single tire.

As in this embodiment, the arrangement is such that the ultrasound probe 59 can be moved both in the tire width direction and in the direction approaching the tire. As a result, it is not only possible to measure the tread thickness D of the tire T in the width direction, but also keep the distance between the ultrasound probe 59 and the tread surface Ts constant even when there is a change in the external diameter of the tire T. Also, it is possible to carry out the measurement while keeping the distance between the ultrasound probe 59 and the tread surface Ts constant along the profile of the tread surface Ts in the tire width direction as measured by the shape measuring means 46. Therefore, the measurement can be made with greater precision.

Also, in the present embodiment, it has been described that the tread thickness D is measured after the profile of the tread surface Ts at the circumferential measurement position of the tread thickness D is measured by the shape measuring means 46. However, the arrangement may be such that after the profile is measured by the shape measuring means 46, the tread thickness D is measured by rotating the tire in the tire rotation direction by a shift angle of "360°-θ" of the measurement position of the ultrasound probe 59 relative to the measurement position of the profile.

The structure of the tire T as described in the foregoing embodiments is only one example. The structure may be such that all the belt layer may be formed of non-magnetic belt cords. Also, all the belt layer may be formed of magnetic belt cords, such as steel cords. In other words, the tread thickness measuring method according to the present invention makes it possible to measure the tread thickness D from the tread surface Ts to the outermost belt 94a whatever the belt material constituting the belt layer of the tire T is.

Also, in the foregoing embodiments, it has been described that the tire T is of a radial structure. However, the tire is not limited to the radial structure, and the tread thickness can be measured even when the tire is of a bias structure. That is, when the tire for tread thickness measurement is of a bias structure, the belt in the description of the foregoing embodiments can be replaced with the carcass ply. Thus the tread thickness from the tread surface to the carcass ply surface located in a radially outermost position of the tire can be measured.

DESCRIPTION OF REFERENCE NUMERALS 2 tire lifting and lowering unit
3 water tank lifting and lowering unit
4 tire holding unit
8 rail
9 slider
15 tire mounting unit
16 tire lifting and lowering mechanism
31 water tank
32 water tank lifting and lowering mechanism
42, 72 rim body
43 tire rotating means
44 internal pressure application means
45 thickness measuring unit
46 shape measuring means
58 ultrasonic measuring unit
59 ultrasound probe
94 belt
94a belt surface
100 measurement control unit
200 arithmetic processing unit
201 groove bottom position identifying means
202 depth estimating means
203 thickness predicting means
204 amplification factor setting means
205 reflected waves amplification means
206 thickness calculating means 207 storage unit
208 ultrasound generation unit
T tire
Ts tread surface

The invention claimed is:

1. A method for measuring tread thickness from tread surface to belt surface located in a radially outermost position within a tire by emitting ultrasonic waves to the tread surface immersed in a liquid and receiving reflected waves, the method comprising the steps of:
    measuring a profile of the tread surface;
    identifying bottom positions of circumferentially extending grooves from the profile obtained in the step of measuring a profile;
    estimating depths from the groove bottoms to belt surface from the groove bottoms identified in the step of identifying bottom positions and pre-created tire design data;
    predicting thicknesses by calculating predicted thicknesses from the tread surface to the belt surface from a relationship between the thicknesses from the groove bottoms identified in the step of identifying bottom positions to the tread surface in the profile and the depths from the groove bottoms to the belt surface estimated in the step of estimating depths; and
    setting amplification factors for received reflected waves according to an amplification factor-thickness data map prepared beforehand in correspondence to the predicated thicknesses.

2. The method for measuring tread thickness according to claim 1, further comprising the step of performing an ultrasonic measurement for measuring the tread thicknesses while keeping a constant distance of emitting ultrasonic waves to the tread surface.

\* \* \* \* \*